US012599526B2

(12) United States Patent
Nguyen et al.

(10) Patent No.: US 12,599,526 B2
(45) Date of Patent: Apr. 14, 2026

(54) SURGICAL SUPPORT SYSTEM WITH SUPPORT TOP HEIGHT ADJUSTMENT

(71) Applicant: Allen Medical Systems, Inc., Batesville, IN (US)

(72) Inventors: Hung D. Nguyen, Worcester, MA (US); Andrew R. Marchand, North Billerica, MA (US); Mary Kelly Chance, Worcester, MA (US); Christopher B. Dubois, Lincoln, RI (US)

(73) Assignee: Allen Medical Systems, Inc., Batesville, IN (US)

( * ) Notice: Subject to any disclaimer, the term of this patent is extended or adjusted under 35 U.S.C. 154(b) by 34 days.

(21) Appl. No.: 18/757,974

(22) Filed: Jun. 28, 2024

(65) Prior Publication Data

US 2025/0000733 A1 Jan. 2, 2025

Related U.S. Application Data

(60) Provisional application No. 63/524,286, filed on Jun. 30, 2023.

(51) Int. Cl.
*A61G 13/06* (2006.01)

(52) U.S. Cl.
CPC .................................... *A61G 13/06* (2013.01)

(58) Field of Classification Search
CPC ....... A61G 13/104; A61G 13/02; A61G 13/06; A61G 13/1295; A61G 2210/10
See application file for complete search history.

(56) References Cited

U.S. PATENT DOCUMENTS

| | | | | |
|---|---|---|---|---|
| 1,021,335 | A | 3/1912 | Robinson | |
| 1,098,477 | A | 6/1914 | Cashman | |
| 1,160,451 | A | 11/1915 | Sanford | |
| 1,171,713 | A | 2/1916 | Gilkerson | |
| 1,372,565 | A | 3/1921 | Skelly | |
| 1,453,013 | A * | 4/1923 | Koenigkramer | A61G 13/009 606/245 |
| 1,528,835 | A | 3/1925 | McCollough | |
| 1,662,464 | A | 3/1928 | McCutchen | |
| 1,799,692 | A | 4/1931 | Knott | |
| 1,938,006 | A | 12/1933 | Blanchard | |
| 2,103,693 | A | 12/1937 | Pohl | |
| 2,188,592 | A | 1/1940 | Hosken et al. | |
| 2,261,297 | A | 11/1941 | Seib | |
| 2,337,505 | A | 12/1943 | Swift | |

(Continued)

FOREIGN PATENT DOCUMENTS

| | | |
|---|---|---|
| DE | 1162508 B | 2/1964 |
| DE | 3438956 A1 | 5/1985 |

(Continued)

OTHER PUBLICATIONS

Trios® Table Base Owner's Manual; Chapter 6; pp. 43-52 (10 pp); 2015.

*Primary Examiner* — Eric J Kurilla
(74) *Attorney, Agent, or Firm* — Barnes & Thornburg LLP

(57) ABSTRACT

A surgical patient support includes a foundation frame and a support top. The foundation frame includes a first column and a second column. The support top is coupled to the first column and the second column and is height adjustable relative to the foundation frame.

18 Claims, 19 Drawing Sheets

(56) References Cited

U.S. PATENT DOCUMENTS 2,452,816 A 11/1948 Wagner
2,613,371 A 10/1952 Keyes, Jr.
2,636,793 A 4/1953 Meyer
2,667,169 A 1/1954 Kambourakis
2,688,410 A 9/1954 Nelson
2,691,979 A 10/1954 Watson
2,764,150 A 9/1956 Ettinger et al.
2,792,945 A 5/1957 Brenny
2,803,022 A 8/1957 Wynkoop
2,880,720 A 4/1959 Houghtaling
3,046,071 A 7/1962 Shampaine et al.
3,049,726 A 8/1962 Getz
3,090,381 A 5/1963 Watson
3,226,734 A 1/1966 Coventon
3,238,539 A 3/1966 Albert
3,281,141 A 10/1966 Smiley et al.
3,286,707 A 11/1966 Shafer
3,302,218 A 2/1967 Stryker
3,388,700 A 6/1968 Mountz
3,428,307 A 2/1969 Owen
3,434,165 A 3/1969 Keane
3,584,321 A 6/1971 Buchanan
3,599,964 A 8/1971 Magni
3,620,210 A * 11/1971 Annas .................... A61H 1/02 601/24
3,640,416 A 2/1972 Temple
3,652,851 A 3/1972 Zaalberg
3,739,406 A 6/1973 Koetter
3,745,996 A 7/1973 Rush
3,751,028 A 8/1973 Scheininger et al.
3,766,384 A 10/1973 Anderson et al.
3,795,018 A 3/1974 Broaded
3,814,414 A 6/1974 Chapa
3,827,089 A 8/1974 Grow
3,832,742 A 9/1974 Stryker
3,859,982 A 1/1975 Dove
3,873,081 A 3/1975 Smith et al.
3,895,403 A 7/1975 Davis et al.
3,946,452 A 3/1976 Eary
3,949,983 A 4/1976 Tommasino et al.
3,988,790 A 11/1976 Mracek et al.
4,071,916 A 2/1978 Nelson
4,101,120 A 7/1978 Seshima
4,131,802 A 12/1978 Braden et al.
4,144,880 A 3/1979 Daniels
4,148,472 A 4/1979 Rais et al.
4,175,550 A 11/1979 Leininger et al.
4,186,917 A 2/1980 Rais et al.
4,227,269 A 10/1980 Johnston
4,239,039 A 12/1980 Thompson
4,244,358 A 1/1981 Pyers
4,257,407 A 3/1981 Macchi
4,356,577 A 11/1982 Taylor et al.
4,384,378 A 5/1983 Getz et al.
4,398,707 A 8/1983 Cloward
4,459,712 A 7/1984 Pathan
4,502,169 A * 3/1985 Persson ................ A61G 7/001 192/93 R
4,503,844 A 3/1985 Siczek et al.
4,545,571 A 10/1985 Chambron
4,552,346 A 11/1985 Schnelle et al.
4,579,111 A 4/1986 Ledesma
4,658,450 A 4/1987 Thompson
4,712,781 A 12/1987 Watanabe
4,730,606 A 3/1988 Leininger
4,763,643 A 8/1988 Vrzalik
4,769,584 A 9/1988 Irigoyen et al.
4,771,785 A 9/1988 Duer et al.
4,827,541 A 5/1989 Vollman
4,840,362 A 6/1989 Bremer et al.
4,850,775 A 7/1989 Lee et al.
4,858,128 A 8/1989 Alsip et al.
4,866,796 A 9/1989 Robinson et al.
4,868,937 A 9/1989 Connolly
4,872,657 A 10/1989 Lussi
4,887,325 A 12/1989 Tesch
4,924,537 A 5/1990 Alsip et al.
4,937,901 A 7/1990 Brennan
4,939,801 A 7/1990 Schaal et al.
4,944,054 A 7/1990 Bossert
4,944,500 A 7/1990 Mueller et al.
4,947,496 A 8/1990 Connolly
4,953,245 A 9/1990 Jung
4,970,737 A 11/1990 Sagel
5,020,170 A 6/1991 Ruf
5,088,706 A 2/1992 Jackson
5,131,106 A 7/1992 Jackson
5,152,024 A 10/1992 Chrones
5,161,267 A 11/1992 Smith
5,181,289 A 1/1993 Kassai
5,210,887 A 5/1993 Kershaw
5,210,888 A 5/1993 Canfield
5,231,741 A 8/1993 Maguire
5,239,716 A 8/1993 Fisk
5,274,862 A 1/1994 Palmer et al.
5,333,334 A 8/1994 Kassai
5,393,018 A 2/1995 Roth et al.
5,404,603 A 4/1995 Fukai
5,444,882 A 8/1995 Andrews et al.
5,461,740 A 10/1995 Pearson
5,483,323 A 1/1996 Matsuda et al.
5,487,195 A 1/1996 Ray
5,499,408 A 3/1996 Nix
5,502,853 A 4/1996 Singleton et al.
5,524,304 A 6/1996 Shutes
5,544,371 A 8/1996 Fuller
5,579,550 A 12/1996 Bathrick et al.
5,588,705 A 12/1996 Chang
5,611,638 A 3/1997 Dörr et al.
5,613,254 A 3/1997 Clayman et al.
5,658,315 A 8/1997 Lamb et al.
5,673,443 A 10/1997 Marmor
5,737,781 A 4/1998 Votel et al.
5,775,334 A 7/1998 Lamb et al.
5,778,467 A 7/1998 Scott et al.
5,794,286 A 8/1998 Scott et al.
5,890,238 A 4/1999 Votel et al.
5,901,388 A 5/1999 Cowan
5,926,871 A 7/1999 Howard
5,937,456 A 8/1999 Norris
5,950,259 A 9/1999 Boggs
6,003,174 A 12/1999 Kantrowitz et al.
6,035,465 A 3/2000 Rogozinski
6,042,558 A 3/2000 Hoyne et al.
6,049,923 A 4/2000 Ochial
6,076,525 A 6/2000 Hoffman
6,094,760 A 8/2000 Nonaka et al.
6,108,838 A 8/2000 Connolly et al.
6,112,349 A 9/2000 Connolly
6,154,901 A 12/2000 Carr
6,230,342 B1 5/2001 Haugs
6,260,220 B1 7/2001 Lamb et al.
6,282,736 B1 9/2001 Hand et al.
6,286,164 B1 9/2001 Lamb et al.
6,295,671 B1 10/2001 Reesby et al.
6,311,349 B1 11/2001 Kazakia et al.
6,315,564 B1 11/2001 Levisman
6,324,710 B1 12/2001 Hernandez et al.
6,385,801 B1 5/2002 Watanabe et al.
6,421,854 B1 7/2002 Heimbrock
6,438,777 B1 8/2002 Bender
6,496,991 B1 12/2002 Votel
6,499,158 B1 12/2002 Easterling
6,499,160 B2 12/2002 Hand et al.
6,505,365 B1 1/2003 Hanson et al.
6,523,197 B2 2/2003 Zitzmann
6,526,610 B1 3/2003 Hand et al.
6,584,630 B1 7/2003 Dinkler
6,609,260 B2 8/2003 Hand et al.
6,615,430 B2 9/2003 Heimbrock
6,622,324 B2 9/2003 VanSteenberg et al.
6,634,043 B2 10/2003 Lamb et al.
6,637,058 B1 10/2003 Lamb
6,638,299 B2 10/2003 Cox

(56) References Cited

U.S. PATENT DOCUMENTS 6,662,388 B2 12/2003 Friel et al.
6,662,391 B2 12/2003 Wilson et al.
6,668,396 B2 12/2003 Wei
6,671,904 B2 1/2004 Easterling
6,681,423 B2 1/2004 Zachrisson
6,691,347 B2 2/2004 Hand et al.
6,701,553 B1 3/2004 Hand et al.
6,701,554 B2 3/2004 Heimbrock
6,721,976 B2 4/2004 Schwaegerle
6,813,788 B2 11/2004 Dinkler et al.
6,817,363 B2 11/2004 Biondo et al.
6,854,137 B2 2/2005 Johnson
6,857,144 B1 2/2005 Huang
6,859,967 B2 3/2005 Harrison et al.
6,862,759 B2 3/2005 Hand et al.
6,862,761 B2 3/2005 Hand et al.
6,874,181 B1 4/2005 Vijayendran
6,886,199 B1 5/2005 Schwaegerle
6,898,811 B2 5/2005 Zucker et al.
6,905,508 B2 * 6/2005 Cuccia ................. A61H 1/0292 606/244
6,912,959 B2 7/2005 Kolody et al.
6,928,676 B1 8/2005 Schwaegerle
6,941,951 B2 9/2005 Hubert et al.
6,966,081 B1 11/2005 Sharps et al.
6,971,997 B1 12/2005 Ryan et al.
6,986,179 B2 1/2006 Varadharajulu et al.
7,020,917 B1 4/2006 Kolody et al.
7,080,422 B2 7/2006 Ben-Levi
7,086,103 B2 8/2006 Barthelt
7,089,612 B2 8/2006 Rocher et al.
7,089,884 B2 8/2006 Wang et al.
7,103,932 B1 9/2006 Kandora
7,137,160 B2 11/2006 Hand et al.
7,152,261 B2 12/2006 Jackson
7,171,709 B2 2/2007 Weismiller
7,189,214 B1 * 3/2007 Saunders ............. A61H 1/0292 5/618
7,197,778 B2 4/2007 Sharps
7,214,138 B1 5/2007 Stivers et al.
7,216,385 B2 5/2007 Hill
7,234,180 B2 6/2007 Horton et al.
7,290,302 B2 11/2007 Sharps
7,343,635 B2 3/2008 Jackson
7,343,916 B2 3/2008 Biondo et al.
7,496,980 B2 3/2009 Sharps
7,520,007 B2 4/2009 Skripps
7,520,008 B2 4/2009 Wong et al.
7,565,708 B2 7/2009 Jackson
7,600,281 B2 10/2009 Skripps
7,653,953 B2 2/2010 Lopez-Sansalvador et al.
7,669,262 B2 3/2010 Skripps et al.
7,681,269 B2 3/2010 Biggie et al.
7,694,369 B2 4/2010 Hinders et al.
7,739,762 B2 6/2010 Lamb et al.
7,810,185 B2 10/2010 Burstner et al.
7,824,353 B2 11/2010 Matta
7,861,720 B1 1/2011 Wolcott
7,882,583 B2 2/2011 Skripps
7,931,607 B2 4/2011 Biondo et al.
7,954,996 B2 6/2011 Boomgaarden et al.
D645,967 S 9/2011 Sharps
8,020,227 B2 9/2011 Dimmer et al.
8,042,208 B2 10/2011 Gilbert et al.
8,056,163 B2 11/2011 Lemire et al.
8,060,960 B2 11/2011 Jackson
8,118,029 B2 2/2012 Gneiting et al.
D663,427 S 7/2012 Sharps
D665,912 S 8/2012 Skripps
8,234,730 B2 8/2012 Skripps
8,234,731 B2 8/2012 Skripps
8,256,050 B2 9/2012 Wong et al.
8,286,283 B2 10/2012 Copeland et al.
D676,971 S 2/2013 Sharps
8,381,331 B2 2/2013 Sharps et al.
8,397,323 B2 3/2013 Skripps et al.
D683,032 S 5/2013 Sharps
8,464,375 B1 6/2013 Jorgensen et al.
8,486,068 B2 7/2013 Starr
8,555,439 B2 10/2013 Soto et al.
8,584,281 B2 11/2013 Diel et al.
8,590,074 B2 11/2013 Hornbach et al.
8,635,725 B2 1/2014 Tannoury et al.
8,676,293 B2 3/2014 Breen et al.
8,677,529 B2 3/2014 Jackson
8,707,476 B2 4/2014 Sharps
8,707,484 B2 4/2014 Jackson et al.
8,719,979 B2 5/2014 Jackson
8,732,876 B2 5/2014 Lachenbruch et al.
8,763,178 B1 7/2014 Martin et al.
8,777,878 B2 7/2014 Deitz
8,782,832 B2 7/2014 Blyakher et al.
8,806,679 B2 8/2014 Soto et al.
8,826,474 B2 9/2014 Jackson
8,826,475 B2 9/2014 Jackson
8,833,707 B2 9/2014 Steinberg et al.
8,839,471 B2 9/2014 Jacksor
8,844,077 B2 9/2014 Jackson et al.
8,845,264 B2 9/2014 Kubiak et al.
8,856,986 B2 10/2014 Jackson
8,864,205 B2 10/2014 Lemire et al.
8,893,333 B2 11/2014 Soto et al.
D720,076 S 12/2014 Sharps et al.
8,938,826 B2 1/2015 Jackson
8,978,180 B2 3/2015 Jackson
8,997,286 B2 4/2015 Wyslucha et al.
9,072,646 B2 7/2015 Skripps et al.
9,119,610 B2 9/2015 Matta et al.
9,180,062 B2 11/2015 Jackson
9,205,013 B2 12/2015 Jackson
9,211,223 B2 12/2015 Jackson
9,233,037 B2 1/2016 Sharps et al.
9,289,342 B2 3/2016 Jackson
9,295,433 B2 3/2016 Jackson et al.
9,308,145 B2 4/2016 Jackson et al.
9,339,430 B2 5/2016 Jackson et al.
9,364,380 B2 6/2016 Jackson
9,498,397 B2 11/2016 Hight et al.
9,561,145 B2 2/2017 Jackson et al.
9,636,266 B2 5/2017 Jackson et al.
10,548,793 B2 * 2/2020 McKenney ............ A61G 13/06
10,561,559 B2 2/2020 Hight et al.
10,792,207 B2 10/2020 Hight et al.
12,029,690 B2 7/2024 Hight et al.
2002/0138906 A1 * 10/2002 Bartlett .................. A61G 7/018 5/609
2004/0133983 A1 7/2004 Newkirk et al.
2005/0155149 A1 7/2005 Pedersen
2005/0235415 A1 10/2005 Pedersen et al.
2006/0123552 A1 6/2006 Ben-Levi
2006/0185090 A1 8/2006 Jackson
2006/0185091 A1 * 8/2006 Jackson ................. A61G 13/04 5/624
2007/0157385 A1 * 7/2007 Lemire ................ A61G 7/0524 5/618
2008/0000028 A1 1/2008 Lemire et al.
2008/0222811 A1 9/2008 Gilbert et al.
2009/0044813 A1 2/2009 Gneiting et al.
2009/0139030 A1 * 6/2009 Yang ...................... A61G 13/10 5/619
2009/0205139 A1 8/2009 Van Deursen et al.
2009/0282614 A1 11/2009 Jackson
2010/0192300 A1 8/2010 Tannoury et al.
2011/0083273 A1 4/2011 Sharps
2011/0099716 A1 * 5/2011 Jackson ............. A61G 13/0036 5/607
2011/0107516 A1 5/2011 Jackson et al.
2012/0144589 A1 6/2012 Skripps et al.
2012/0198625 A1 8/2012 Jackson
2013/0111666 A1 5/2013 Jackson
2013/0205500 A1 8/2013 Jackson
2013/0219623 A1 8/2013 Jackson
2013/0254995 A1 10/2013 Jackson
2013/0254996 A1 10/2013 Jackson

(56) References Cited

U.S. PATENT DOCUMENTS

| | | | |
|---|---|---|---|
| 2013/0254997 | A1 | 10/2013 | Jackson |
| 2013/0269710 | A1* | 10/2013 | Hight ...................... F16H 21/06 128/845 |
| 2013/0312181 | A1 | 11/2013 | Jackson et al. |
| 2013/0312187 | A1 | 11/2013 | Jackson |
| 2013/0312188 | A1 | 11/2013 | Jackson |
| 2013/0326813 | A1 | 12/2013 | Jackson |
| 2014/0007349 | A1 | 1/2014 | Jackson |
| 2014/0020181 | A1 | 1/2014 | Jackson |
| 2014/0033434 | A1 | 2/2014 | Jackson |
| 2014/0033436 | A1 | 2/2014 | Jackson |
| 2014/0068861 | A1 | 3/2014 | Jackson et al. |
| 2014/0082842 | A1 | 3/2014 | Jackson |
| 2014/0109316 | A1 | 4/2014 | Jackson et al. |
| 2014/0173826 | A1 | 6/2014 | Jackson |
| 2014/0196212 | A1 | 7/2014 | Jackson |
| 2014/0201913 | A1 | 7/2014 | Jackson |
| 2014/0201914 | A1 | 7/2014 | Jackson |
| 2014/0208512 | A1 | 7/2014 | Jackson |
| 2014/0317847 | A1 | 10/2014 | Jackson |
| 2015/0059094 | A1 | 3/2015 | Jackson |
| 2015/0150743 | A1 | 6/2015 | Jackson |
| 2016/0000621 | A1 | 1/2016 | Jackson et al. |
| 2016/0000626 | A1 | 1/2016 | Jackson et al. |
| 2016/0000627 | A1 | 1/2016 | Jackson et al. |
| 2016/0000629 | A1 | 1/2016 | Jackson et al. |
| 2016/0361218 | A1 | 12/2016 | Dubois et al. |
| 2017/0027797 | A1 | 2/2017 | Dolliver et al. |
| 2017/0112698 | A1 | 4/2017 | Hight et al. |
| 2017/0135890 | A1 | 5/2017 | DuBois et al. |
| 2020/0146915 | A1 | 5/2020 | Hight et al. |

FOREIGN PATENT DOCUMENTS

| | | | |
|---|---|---|---|
| DE | 4039907 | A1 | 7/1991 |
| DE | 19723927 | C2 | 5/2003 |
| DE | 10158470 | A1 | 6/2003 |
| DE | 202008001952 | U1 | 6/2008 |
| DE | 4429062 | C2 | 8/2008 |
| EP | 617947 | B1 | 1/1995 |
| EP | 1210049 | A1 | 6/2002 |
| EP | 1159947 | B1 | 9/2006 |
| EP | 1686944 | A1 | 8/2008 |
| EP | 1982680 | B1 | 7/2011 |
| EP | 2653145 | A2 | 10/2013 |
| EP | 3 124 000 | A1 | 2/2017 |
| FR | 2247194 | B1 | 10/1977 |
| GB | 2210554 | B | 9/1989 |
| JP | S57-107466 | U | 7/1982 |
| JP | 2001112582 | A | 4/2001 |
| JP | 2002-519111 | A | 7/2002 |
| JP | 2013-223722 | A | 10/2013 |
| WO | 2004026212 | A1 | 4/2004 |
| WO | 2006061606 | A1 | 6/2006 |
| WO | 2009071787 | A2 | 6/2009 |
| WO | 2011/006163 | A2 | 1/2011 |

* cited by examiner

SURGICAL SUPPORT SYSTEM WITH SUPPORT TOP HEIGHT ADJUSTMENT

PRIORITY CLAIM

This application claims priority under 35 U.S.C. § 119 (e) to U.S. Provisional Patent Application No. 63/524,286, filed Jun. 30, 2023, which is expressly incorporated by reference herein in its entirety.

BACKGROUND

The present disclosure relates to patient support apparatuses such as are used to support a patient in different positions. More particularly, the present disclosure relates to surgical tables used during surgery to support a patient in a predetermined position or number of positions. However, the present disclosure may also be applicable to other types of patient support apparatuses such as hospital beds, home care beds, x-ray tables, therapy supports, wheel chairs, and the like.

Sometimes, surgical tables allow adjustment of the table prior to surgery so that patients can be properly supported or held in place for a particular surgical operation. Also, some surgical tables allow adjustment during surgery so that a patient is moved to different positions during an operation. Many such surgical tables are difficult to adjust prior to and/or during surgery.

SUMMARY

The present application discloses one or more of the features recited in the appended claims and/or the following features which, alone or in any combination, may comprise patentable subject matter:

According to the present disclosure, a surgical table includes a foundation frame including a first column, a second column spaced apart from the first column, and an extension interconnecting lower ends of the first column and the second column. The surgical table may further include a support top configured to support a patient thereon and supported above ground by the first column and the second column. The surgical table may further include a yoke bracket arranged to interconnect at least one of the first and second columns and the support top.

In some embodiments, the yoke bracket includes a base member. In some embodiments the yoke bracket includes a left coupling member coupled to base member and extending substantially perpendicular to the base member. The left coupling member may be formed to include a number of attachment holes situated between a front surface and a back surface of the left coupling member. In some embodiments, the yoke bracket further includes a right coupling member coupled to base member and extending substantially perpendicular to the base member. The right coupling member may be formed to include a number of attachment holes situated between a front surface and a back surface of the left coupling member.

In some embodiments, the yoke bracket further includes a support-top height adjuster interconnecting the left and right coupling members to the support top and configured to engage selectively with one of the attachment holes formed in the left and right coupling members to establish a selected height of the support top from the ground.

In some embodiments, the support-top height adjuster includes a carriage assembly movable slidably along the left and right coupling members, a left height-adjustment handle coupled to a left side of the carriage assembly, and a right height-adjustment handle coupled to a right side of the carriage assembly.

In some embodiments, the left and right height-adjustment handles are movable from a locked position, in which a lock pin of the left and right height-adjustment handles extend into a respective one of the attachment holes formed in the left and right coupling members to retain the support top at the selected height, and an unlocked position, in which the lock pin of the left and right height-adjustment handles are removed from the attachment holes of both the left and right coupling members so that the carriage assembly and at least a portion of the support top is movable together upwardly or downwardly along the left and right coupling members of the yoke bracket to a different selected height.

In some embodiments, the first height-adjustment handle includes a first handgrip, a first lock pin fixed to the first handgrip for movement therewith, and a first guide shaft fixed to the carriage assembly and received in a first shaft passageway formed in the first handgrip, and wherein the second height-adjustment handle includes a second handgrip, a second lock pin fixed to the second handgrip for movement therewith, and a second guide shaft fixed to the carriage assembly and received in a second shaft passageway formed in the second handgrip.

In some embodiments, the first and second handgrips are configured to move away from one another to withdraw the first and second lock pins from the attachment holes formed in the left and right coupling members.

In some embodiments, each handgrip is formed to include a guide slot opening into each respective shaft passageway.

In some embodiments, the first guide shaft includes a first guide pin extending radially outward and into the guide slot formed in the first handgrip and the second guide shaft includes a second guide pin extending radially outward and into the guide slot formed in the second handgrip.

In some embodiments, the first height-adjustment handle further includes a plurality of peripheral support rods spaced circumferentially around the first guide shaft and that extend into respective passageways formed in the first handgrip, and the second height-adjustment handle further includes a plurality of peripheral support rods spaced circumferentially around the second guide shaft and that extend into respective passageways formed in the second handgrip.

In some embodiments, the first lock pin extends through a first pin-receiving slot formed in the first guide shaft and the second lock pin extends through a second pin-receiving slot formed in the second guide shaft.

In some embodiments, the first and second lock pins are biased toward one another to automatically extend though respective attachment holes to the locked position when the left and right handgrips are released.

In some embodiments, the carriage assembly includes a cross beam interconnecting the left and right coupling members, a first handle mount coupled to a left side of the cross beam and the left height-adjustment handle, a second handle mount coupled to a right side of the cross beam and the right height-adjustment handle, and a table mount assembly coupled to the cross beam and arranged to lie inwardly between the left and right coupling members.

In some embodiments, the cross beam includes a beam body and a plurality of rollers coupled to the beam body and configured to engage the left and right coupling members to guide upward and downward movement of the carriage assembly along the left and right coupling members.

In some embodiments, the left and right coupling members each include coupling member body which is formed to include the number of attachment holes and a coupling member flange spaced apart from the number of attachment holes, and wherein the plurality of rollers are configured to engage and roll along each respective coupling member flange.

In some embodiments, the support top includes a motion coupler having a connector beam arranged to lie between the left and right coupling members and a connector arm coupled to the connector beam and arranged to engage and support the support top, and the table mount assembly is configured to selectively engage the connector beam to retain the connector beam to the table mount assembly.

In some embodiments, the connector beam is a tubular member and is formed to include opposing pin-receiving slots at opposite ends thereof, each pin-receiving slot is configured to receive a respective lock pin when the height-adjustment handles are in the locked position.

In some embodiments, the connector arm is pivotable about an axis extending longitudinally through the connector beam to adjust an inclination angle of the support top.

In some embodiments, the table mount assembly includes a left and right connector-beam supports fixed to the cross beam, a pivot shaft interconnecting the left and right connector-beam supports, and a first pair of attachment hooks coupled to the pivot shaft and configured to engage the connector beam to retain the support top to the carriage assembly.

In some embodiments, the attachment hooks are pivotable about the pivot shaft from a locked position blocking separation of the motion coupler and the support top from the carriage assembly and a released position spaced from the motion coupler to allow separation of the connector beam and the connector arm from the table mount assembly.

In some embodiments, at least one of the first column and the second column includes a column base, a connector block coupled to the yoke bracket to support the yoke bracket on the column base, and a bracket retention system including a lock pin movable between a locked position and an unlocked position, a first detent pin fixed to the connector block, and a second detent pin fixed to one of the left and right coupling members with the lock pin.

In some embodiments, in the locked position, the lock pin is received within a throughhole formed in one of the left and right coupling members and a blind hole formed in the connector block and engages the first detent pin to block sliding movement of the lock pin to the unlocked position, and, in the unlocked position, the lock pin is removed from the blind hole formed in the connector block and engages the second detent pin to block sliding movement of the lock pin to the locked position.

In some embodiments, the lock pin is formed to include a first detent channel and a second detent channel.

In some embodiments, (i) the first detent pin is configured to extend into the first detent channel and the second detent pin is configured to extend into the second detent channel in the locked position, and (ii) the second detent pin is configured to extend in to the first detent channel in the unlocked position.

In some embodiments, the first detent pin extends along a first axis and engages the lock pin at a first circumferential orientation relative to the lock pin and the second detent pin extends along a second axis and engages the lock pin at a second circumferential orientation relative to the lock pin different than the first circumferential orientation.

In some embodiments, the lock pin includes a pin shaft formed with the first and second detent channels, a retainer ring arranged to lie between the first and second detent channels, and a pin head arranged outside of the throughhole and the blind hole and configured to be gripped by a user to move the lock pin between the locked position and the unlocked position.

In some embodiments, the lock pin is a first lock pin that extends through the left coupling member and into a left side of the connector block and wherein the bracket retention system further includes a second lock pin that extends through the right coupling member and into a right side of the connector block.

In some embodiments, each coupling member is formed to include a retainer slot and the connector block includes a retainer pin on both the left and right sides thereof that extends into a respective retainer slot.

In some embodiments, the first and second lock pins each extend only partway through the connector block in the locked position.

In some embodiments, at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position.

In some embodiments, in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position.

In some embodiments, the lock pin is formed to include a first channel and a second channel spaced apart from the first channel.

In some embodiments, the pin latch extends into the second channel when the lock pin is in the locked position and the pin latch extends into the second channel when the lock pin is in the unlocked position.

In some embodiments, the first and second channels are formed only partway around a circumference of the lock pin.

In some embodiments, the first and second channels are formed about halfway around a circumference of the lock pin.

In some embodiments, the first and second channels are aligned with one another in a longitudinal direction of the lock pin.

In some embodiments, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments, the latch bar is biased toward the latched position to automatically extend into one of the first and second channels when the lock pin is in the locked position or the unlocked position.

In some embodiments, the lock pin includes a pin shaft that is formed to include a first channel and a second channel spaced apart from the first channel, an eyelet coupled to a distal end of the pin shaft and configured to be gripped by a user to withdraw the lock pin from the blind hole formed in the connector block, and a retainer ring coupled to an outer surface of the pin shaft between the first and second channels and configured to retain the lock pin to the one of the left and right coupling members in the unlocked position.

In some embodiments, the retainer ring is configured to engage a portion of the connector block in the locked position to align the second channel with the pin latch and the retainer ring is configured to engage a portion of the one of the left and right coupling members in the unlocked position to align the first channel with the pin latch.

In some embodiments, the lock pin further includes a key coupled to the outer surface of the pin shaft and the throughhole formed in the one of the left and right coupling members is formed to include a notch that matches and receives the key.

In some embodiments, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments, the latch bar is biased toward the latched position to automatically extend into one of the first and second channels when the lock pin is in the locked position or the unlocked position.

In some embodiments, the pin latch includes a latch bar configured to extend into a channel formed in the lock pin to block sliding movement of the lock pin from the locked position to the unlocked position and a latch handle configured to be moved by a user to change the pin latch between the latched position, in which the latch bar extends into the channel of the lock pin, and the unlatched position, in which the latch bar is removed from the channel and the lock pin is free to slide relative to the connector block from the locked position to the unlocked position.

In some embodiments, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments, the latch bar is biased toward the latched position to automatically extend into the channel when the lock pin is in the locked position or the unlocked position.

According to a second aspect of the present disclosure, a surgical table includes a foundation frame including a first column, a second column spaced apart from the first column, and an extension interconnecting lower ends of the first column and the second column. The surgical table may further include a support top configured to support a patient thereon and supported above ground by the first column and the second column. The surgical table may further include a yoke bracket arranged to interconnect at least one of the first and second columns and the support top.

In some embodiments of the second aspect, the yoke bracket includes a base member. In some embodiments of the second aspect, the yoke bracket includes a left coupling member coupled to base member and extending substantially perpendicular to the base member, the left coupling member formed to include a number of attachment holes situated between a front surface and a back surface of the left coupling member. In some embodiments of the second aspect, the yoke bracket includes a right coupling member coupled to base member and extending substantially perpendicular to the base member, the right coupling member formed to include a number of attachment holes situated between a front surface and a back surface of the left coupling member.

In some embodiments of the second aspect, at least one of the first column and the second column includes a column base, a connector block coupled to the yoke bracket to support the yoke bracket on the column base, and a bracket retention system including a lock pin movable between a locked position and an unlocked position, a first detent pin fixed to the connector block, and a second detent pin fixed to one of the left and right coupling members with the lock pin.

In some embodiments of the second aspect, in the locked position, the lock pin is received within a throughhole formed in one of the left and right coupling members and a blind hole formed in the connector block and engages the first detent pin to block sliding movement of the lock pin to the unlocked position, and, in the unlocked position, the lock pin is removed from the blind hole formed in the connector block and engages the second detent pin to block sliding movement of the lock pin to the locked position.

In some embodiments of the second aspect, the lock pin is formed to include a first detent channel and a second detent channel.

In some embodiments of the second aspect, (i) the first detent pin is configured to extend into the first detent channel and the second detent pin is configured to extend into the second detent channel in the locked position, and (ii) the second detent pin is configured to extend in to the first detent channel in the unlocked position.

In some embodiments of the second aspect, the first detent pin extends along a first axis and engages the lock pin at a first circumferential orientation relative to the lock pin and the second detent pin extends along a second axis and engages the lock pin at a second circumferential orientation relative to the lock pin different than the first circumferential orientation.

In some embodiments of the second aspect, the lock pin includes a pin shaft formed with the first and second detent channels, a retainer ring arranged to lie between the first and second detent channels, and a pin head arranged outside of the throughhole and the blind hole and configured to be gripped by a user to move the lock pin between the locked position and the unlocked position.

In some embodiments of the second aspect, the lock pin is a first lock pin that extends through the left coupling member and into a left side of the connector block and wherein the bracket retention system further includes a second lock pin that extends through the right coupling member and into a right side of the connector block.

In some embodiments of the second aspect, each coupling member is formed to include a retainer slot and the connector block includes a retainer pin on both the left and right sides thereof that extends into a respective retainer slot.

In some embodiments of the second aspect, the first and second lock pins each extend only partway through the connector block in the locked position.

In accordance with a third aspect of the present disclosure, a surgical table includes a foundation frame including a first column, a second column spaced apart from the first column, and an extension interconnecting lower ends of the first column and the second column. The surgical table may further include a support top configured to support a patient thereon and supported above ground by the first column and the second column. The surgical table may further include a yoke bracket arranged to interconnect at least one of the first and second columns and the support top.

In some embodiments of the third aspect, the yoke bracket includes a base member. In some embodiments of the third aspect, the yoke bracket includes a left coupling member coupled to base member and extending substantially perpendicular to the base member, the left coupling member formed to include a number of attachment holes situated between a front surface and a back surface of the left coupling member. In some embodiments of the third aspect, the yoke bracket includes a right coupling member coupled to base member and extending substantially perpendicular to the base member, the right coupling member formed to include a number of attachment holes situated between a front surface and a back surface of the left coupling member.

In some embodiments of the third aspect, at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position.

In some embodiments of the third aspect, in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position.

In some embodiments of the third aspect, the lock pin is formed to include a first channel and a second channel spaced apart from the first channel.

In some embodiments of the third aspect, the pin latch extends into the second channel when the lock pin is in the locked position and the pin latch extends into the second channel when the lock pin is in the unlocked position.

In some embodiments of the third aspect, the first and second channels are formed only partway around a circumference of the lock pin.

In some embodiments of the third aspect, the first and second channels are formed about halfway around a circumference of the lock pin.

In some embodiments of the third aspect, the first and second channels are aligned with one another in a longitudinal direction of the lock pin.

In some embodiments of the third aspect, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments of the third aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the third aspect, the latch bar is biased toward the latched position to automatically extend into one of the first and second channels when the lock pin is in the locked position or the unlocked position.

In some embodiments of the third aspect, the lock pin includes a pin shaft that is formed to include a first channel and a second channel spaced apart from the first channel, an eyelet coupled to a distal end of the pin shaft and configured to be gripped by a user to withdraw the lock pin from the blind hole formed in the connector block, and a retainer ring coupled to an outer surface of the pin shaft between the first and second channels and configured to retain the lock pin to the one of the left and right coupling members in the unlocked position.

In some embodiments of the third aspect, the retainer ring is configured to engage a portion of the connector block in the locked position to align the second channel with the pin latch and the retainer ring is configured to engage a portion of the one of the left and right coupling members in the unlocked position to align the first channel with the pin latch.

In some embodiments of the third aspect, the lock pin further includes a key coupled to the outer surface of the pin shaft and the throughhole formed in the one of the left and right coupling members is formed to include a notch that matches and receives the key.

In some embodiments of the third aspect, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments of the third aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the third aspect, the latch bar is biased toward the latched position to automatically extend into one of the first and second channels when the lock pin is in the locked position or the unlocked position.

In some embodiments of the third aspect, the pin latch includes a latch bar configured to extend into a channel formed in the lock pin to block sliding movement of the lock pin from the locked position to the unlocked position and a latch handle configured to be moved by a user to change the pin latch between the latched position, in which the latch bar extends into the channel of the lock pin, and the unlatched position, in which the latch bar is removed from the channel and the lock pin is free to slide relative to the connector block from the locked position to the unlocked position.

In some embodiments of the third aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the third aspect, the latch bar is biased toward the latched position to automatically extend into the channel when the lock pin is in the locked position or the unlocked position.

In accordance with a fourth aspect of the present disclosure, a surgical table includes a foundation frame including a first column, a second column spaced apart from the first column, and an extension interconnecting lower ends of the first column and the second column. The surgical table may further include a support top configured to support a patient thereon and supported above ground by the first column and the second column. The surgical table may further include a yoke bracket arranged to interconnect at least one of the first and second columns and the support top.

In some embodiments of the fourth aspect, the yoke bracket includes an upper base member. In some embodiments of the fourth aspect, the yoke bracket includes a lower base member spaced vertically from the upper base member. In some embodiments of the fourth aspect, the yoke bracket includes a support-top height adjuster interconnecting the upper and lower base members to the support top and configured to establish a selected height of the support top from the ground.

In some embodiments of the fourth aspect, the support-top height adjuster includes a guide member interconnecting the upper and lower base members and a carriage assembly coupled to the support top and movable slidably along the guide member.

In some embodiments of the fourth aspect, the guide member includes an outer sleeve defining a sleeve interior, a threaded rod arranged to lie within the sleeve interior, and a retainer threadingly engaged with the threaded rod and movable vertically along the threaded rod relative to the outer sleeve.

In some embodiments of the fourth aspect, the carriage assembly includes a support-top mount coupled to the guide member and the support top, a left and right height-adjustment handles coupled to opposite sides of the support-top mount, and a carriage lock configured to engage selectively with the retainer to lock the carriage assembly at the selected height.

In some embodiments of the fourth aspect, the support-top mount includes a cross beam coupled to the left and right height-adjustment handles, a table mount configured to releasably engage with the support top, and a sleeve mount coupled to the outer sleeve and configured to interact with the outer sleeve to guide movement of the carriage assembly vertically along the outer sleeve.

In some embodiments of the fourth aspect, the left and right height adjustment handles are coupled to the carriage lock and are movable inwardly and outwardly toward and away from one another relative to the support-top mount to change the carriage lock from a locked position engaging the retainer and an unlocked position spaced from the retainer.

In some embodiments of the fourth aspect, the retainer includes a polygon-shaped cross section and the carriage lock includes a polygon-shaped opening that matches the polygon-shaped cross section of the retainer.

In some embodiments of the fourth aspect, in the unlocked position, the retainer is configured to rotate about threaded rod in response to vertical movement of carriage assembly relative to the outer sleeve, and, in the locked position, the retainer is received in the polygon-shaped opening to block rotation of the retainer about the threaded rod so that vertical movement of the carriage assembly is blocked.

In some embodiments of the fourth aspect, the carriage lock is biased toward the locked position.

In some embodiments of the fourth aspect, the tabletop mount includes left and right connector-beam supports fixed to the cross beam, a pivot shaft interconnecting the left and right connector-beam supports, and a pair of attachment hooks coupled to the pivot shaft and configured to engage a connector beam coupled to the support top to retain the support top to the carriage assembly.

In some embodiments of the fourth aspect, the attachment hooks are pivotable about the pivot shaft from a locked position blocking separation of the connector beam and the support top from the carriage assembly and a released position spaced from the connector beam to allow separation of the connector beam and the support top from the carriage assembly.

In some embodiments of the fourth aspect, at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position.

In some embodiments of the fourth aspect, in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position In some embodiments of the fourth aspect, the lock pin is formed to include a first detent channel and a second detent channel.

In some embodiments of the fourth aspect, (i) the first detent pin is configured to extend into the first detent channel and the second detent pin is configured to extend into the second detent channel in the locked position, and (ii) the second detent pin is configured to extend in to the first detent channel in the unlocked position.

In some embodiments of the fourth aspect, the first detent pin extends along a first axis and engages the lock pin at a first circumferential orientation relative to the lock pin and the second detent pin extends along a second axis and engages the lock pin at a second circumferential orientation relative to the lock pin different than the first circumferential orientation.

In some embodiments of the fourth aspect, the lock pin includes a pin shaft formed with the first and second detent channels, a retainer ring arranged to lie between the first and second detent channels, and a pin head arranged outside of the throughhole and the blind hole and configured to be gripped by a user to move the lock pin between the locked position and the unlocked position.

In some embodiments of the fourth aspect, the lock pin is a first lock pin that extends through the left coupling member and into a left side of the connector block and wherein the bracket retention system further includes a second lock pin that extends through the right coupling member and into a right side of the connector block.

In some embodiments of the fourth aspect, each coupling member is formed to include a retainer slot and the connector block includes a retainer pin on both the left and right sides thereof that extends into a respective retainer slot.

In some embodiments of the fourth aspect, the first and second lock pins each extend only partway through the connector block in the locked position.

In some embodiments of the fourth aspect, at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position.

In some embodiments of the fourth aspect, in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position.

In some embodiments of the fourth aspect, the lock pin is formed to include a first channel and a second channel spaced apart from the first channel.

In some embodiments of the fourth aspect, the pin latch extends into the second channel when the lock pin is in the locked position and the pin latch extends into the second channel when the lock pin is in the unlocked position.

In some embodiments of the fourth aspect, the first and second channels are formed only partway around a circumference of the lock pin.

In some embodiments of the fourth aspect, the first and second channels are formed about halfway around a circumference of the lock pin.

In some embodiments of the fourth aspect, the first and second channels are aligned with one another in a longitudinal direction of the lock pin.

In some embodiments of the fourth aspect, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments of the fourth aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the fourth aspect, the latch bar is biased toward the latched position to automatically extend into one of the first and second channels when the lock pin is in the locked position or the unlocked position.

In some embodiments of the fourth aspect, the lock pin includes a pin shaft that is formed to include a first channel and a second channel spaced apart from the first channel, an eyelet coupled to a distal end of the pin shaft and configured to be gripped by a user to withdraw the lock pin from the blind hole formed in the connector block, and a retainer ring coupled to an outer surface of the pin shaft between the first and second channels and configured to retain the lock pin to the one of the left and right coupling members in the unlocked position.

In some embodiments of the fourth aspect, the retainer ring is configured to engage a portion of the connector block in the locked position to align the second channel with the pin latch and the retainer ring is configured to engage a portion of the one of the left and right coupling members in the unlocked position to align the first channel with the pin latch.

In some embodiments of the fourth aspect, the lock pin further includes a key coupled to the outer surface of the pin shaft and the throughhole formed in the one of the left and right coupling members is formed to include a notch that matches and receives the key.

In some embodiments of the fourth aspect, the pin latch includes a latch bar configured to extend into one of the first and second channels to block sliding movement of the lock pin between the locked and unlocked positions and a latch handle configured to be moved by a user to change the pin latch between the latched position, in which the latch bar extends into one of the first and second channels of the lock pin, and the unlatched position, in which the latch bar is removed from the first and second channels and the lock pin is free to slide relative to the connector block between the locked and unlocked positions.

In some embodiments of the fourth aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the fourth aspect, the latch bar is biased toward the latched position to automatically extend into one of the first and second channels when the lock pin is in the locked position or the unlocked position.

In some embodiments of the fourth aspect, the pin latch includes a latch bar configured to extend into a channel formed in the lock pin to block sliding movement of the lock pin from the locked position to the unlocked position and a latch handle configured to be moved by a user to change the pin latch between the latched position, in which the latch bar extends into the channel of the lock pin, and the unlatched position, in which the latch bar is removed from the channel and the lock pin is free to slide relative to the connector block from the locked position to the unlocked position.

In some embodiments of the fourth aspect, the pin latch further includes a latch pivot axle that extends through at least one of the latch bar and the latch handle and into the one of the left and right coupling members to control pivotable movement of the pin latch about a latch pivot axis between the latched and unlatched positions.

In some embodiments of the fourth aspect, the latch bar is biased toward the latched position to automatically extend into the channel when the lock pin is in the locked position or the unlocked position.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which.

DETAILED DESCRIPTION

Figure 1:
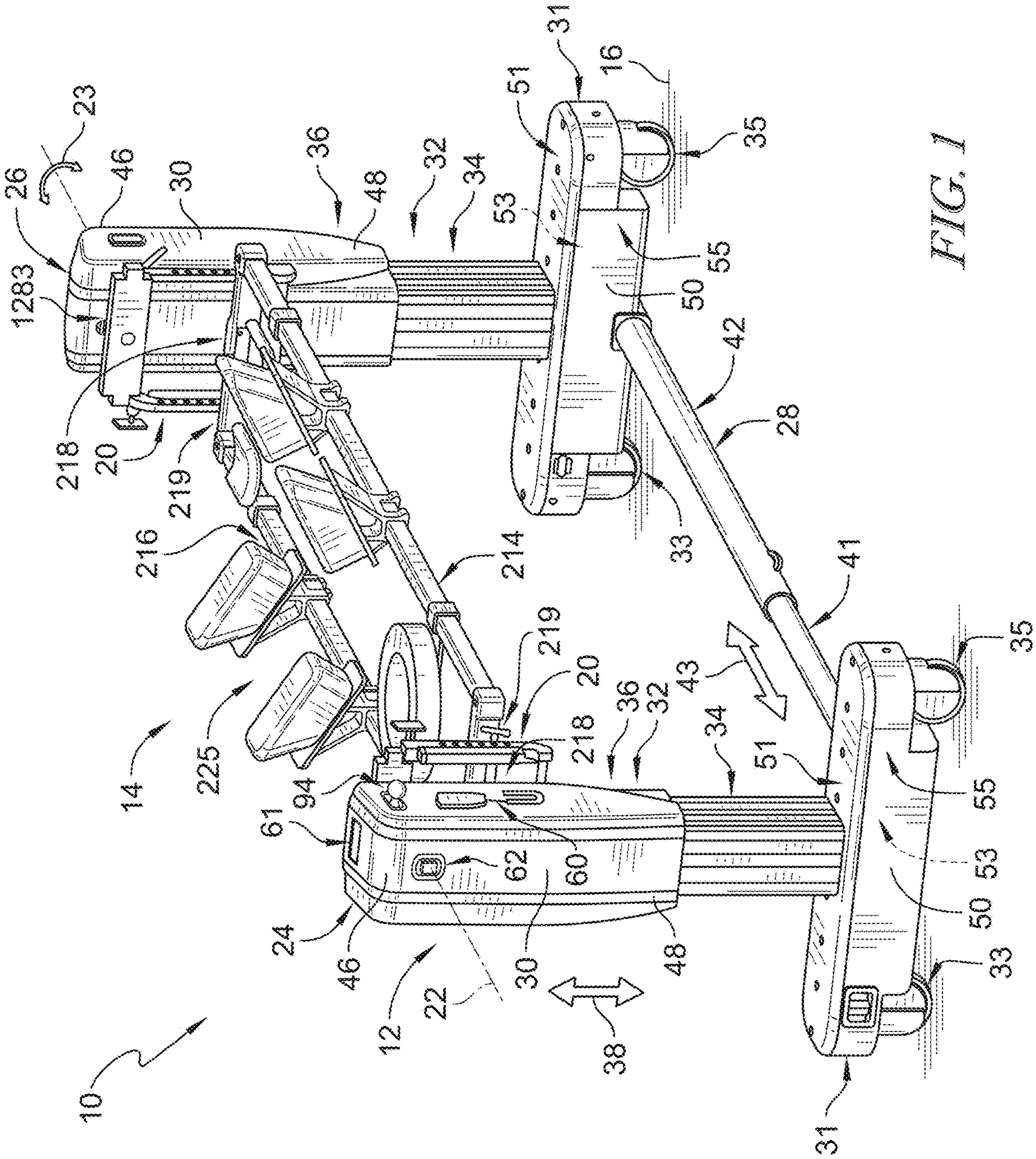
FIG. 1 is a perspective view of a patient support apparatus including a foundation frame and a patient support top supported on the foundation frame to rotate about an axis.

A patient support apparatus 10 for supporting a patient during surgery is shown in FIG. 1. The patient support apparatus 10 illustratively includes a foundation frame 12 and a patient support top 14. The foundation frame 12 rests on a floor 16 and is configured to suspend the support top 14 in a number of different positions above the floor 16. Thus, a patient undergoing surgery can be moved with the support top 14 to a number of different positions and orientations depending on the particular surgical operation to be performed on the patient. In the illustrative embodiment, the patient support apparatus 10 is a surgical table, however, other types of patient support apparatuses are also envisioned.

The foundation frame 12 includes a first column 24, a second column 26, an extension 28, and a control system 30 as shown in FIG. 1. In the illustrative embodiment, the first column 24 is a head-end column and the second column 26 is a foot-end column. The support top 14 is coupled to the foundation frame 12 between the columns 24, 26 via yoke brackets 20. The support top 14 and the yoke brackets 20 are configured to rotate relative to the foundation frame 12 about a pivot axis 22 as suggested by arrow 23 in FIG. 1. The pivot axis 22 extends parallel to, and is spaced apart from, the length of the support top 14. Thus, a patient can be rotated prior to or during a surgical operation.

Each column 24, 26 includes a base 31 and an upright 32 extending up from the base 31 as shown in FIG. 1. Each base 31 includes a horizontal top plate 51, a vertical lower plate 53 extending down from the horizontal plate 51, and a cover 55 coupled the top plate 51 to house the lower plate 53. Each upright 32 includes a lower section 34 and an upper section 36 that is movable vertically up and down along the lower section 34 as suggested by arrow 38 to raise and lower each end of the support top 14. Thus, a patient can be raised, lowered, or inclined prior to or during a surgical operation at the discretion of a surgeon.

Additionally, each column 24, 26 of the patient support apparatus 10 includes a pair of casters 33, 35 that engage the floor 16 as shown in FIG. 1. All of the casters 33, 35 are selectively freed to allow the patient support apparatus 10 to roll along the floor 16 to different surgery or storage rooms within a healthcare facility. However, during surgical operations, the patient support apparatus 10 may be held in place relative to the floor 16 to minimize unwanted movement of the patient during the operation.

The extension 28 extends between the columns 24, 26 and includes a first tube 41 and a second tube 42 configured to telescope as suggested by arrow 43 in FIG. 1. Telescoping of the tubes 41, 42 allow the columns 24, 26 to be moved between a deployed position, spaced to support the support top 14, and a storage position, collapsed together reducing the footprint of the foundation frame 12.

The control system 30 is configured to control the motions of the patient support apparatus 10. Specifically, the control system 30 directs rotation of the support top 14 about the pivot axis 22, movement of the upper section 36 along the lower section 34 of each upright 32 to raise and lower the ends of the support top 14, and freedom of the casters 33, 35 to roll along the floor 16.

The patient support top 14 is dynamically coupled to the foundation frame 12 so that the patient support top 14 can move in response to reconfiguration of the foundation frame 12 as shown in FIG. 1. The patient support top 14 includes a first rail 214, a second rail 216, a pair of cross beams 219 located at either end of the first rail 214 and the second rail 216, and two motion couplers 218 each coupled to a cross beam 219 as shown in FIG. 1. The first rail 214 and the second rail 216 are spaced apart and extend parallel to one another. The cross beams 219 extend from the first rail 214 to the second rail 216 to establish a support frame 225 upon which a surgical patient is supported. The motion couplers 218 are coupled to the support frame 225 and to the foundation frame 12 (by the yoke bracket 20) to allow movement of the support frame 225 about a horizontal axis 215 relative to the foundation frame 12, for instance, in response to reconfiguration of the rotation system 46 and/or the lift system 48 of the foundation frame 12. In addition, the motion couplers 218 allow sliding and shifting of the support frame 225 relative to the foundation frame 12.

Figure 2:
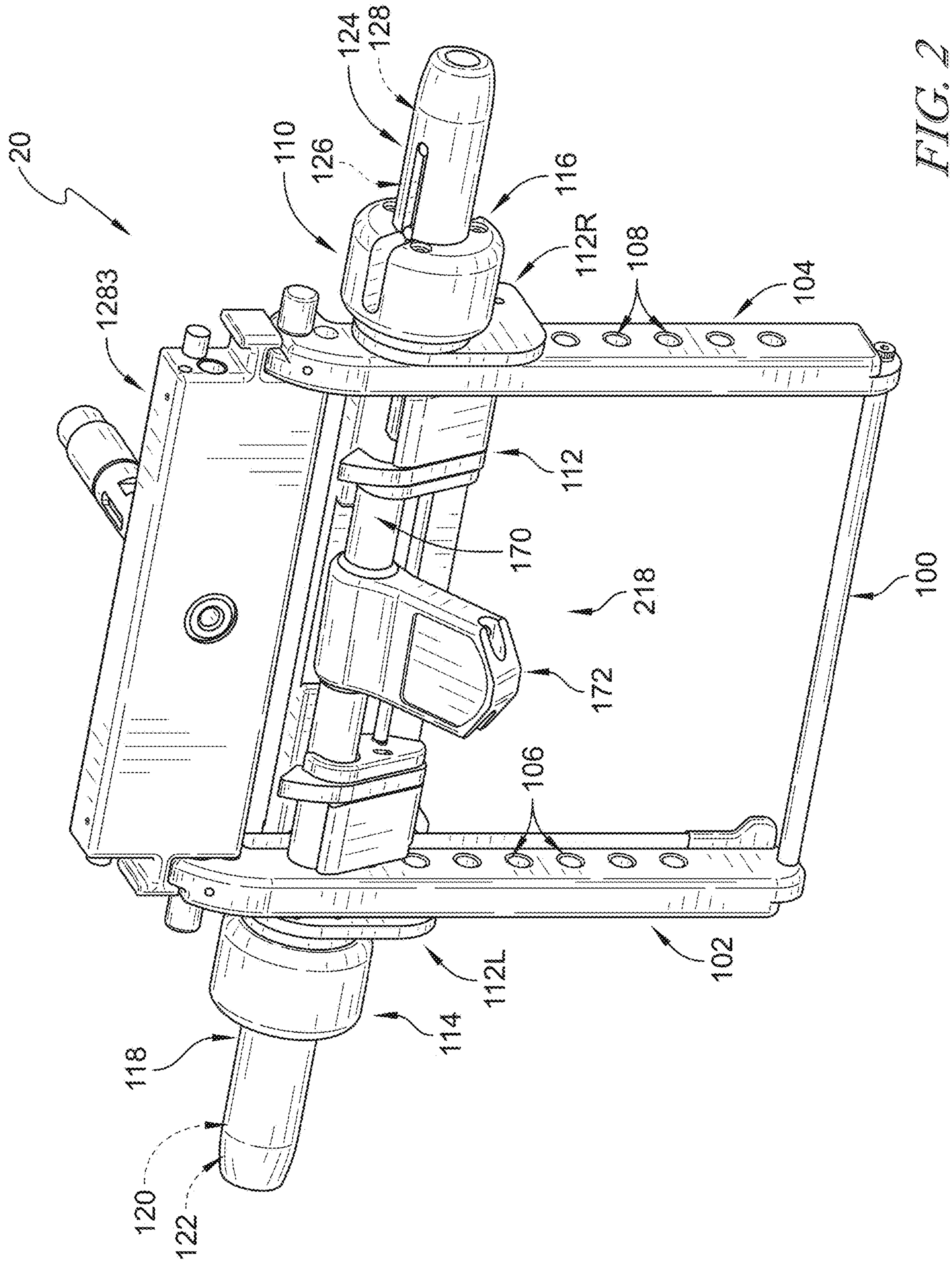
FIG. 2 is a perspective view of a yoke bracket included in the patient support apparatus of FIG. 1.

The yoke brackets 20, sometimes called "H" brackets, are coupled between the foundation frame 12 and the patient support top 14 as shown in FIG. 1. Each yoke bracket 20 includes a base member 100, a left coupling member 102, and a right coupling member 104 spaced apart from the left coupling member 102 as shown in FIG. 2. The left coupling member 102 is coupled to the base member 100 and extends substantially perpendicular to the base member 100. The right coupling member 104 is coupled to an opposite side of the base member 260 from the left coupling member 102 and extends substantially perpendicularly to the base member 100 and substantially parallel to the left coupling member 102. Both the left and right coupling members 102, 104 are formed to include a number of attachment holes 106, 108 situated between a front surface and a back surface of the each coupling member 102, 104. In some embodiments, the base member 100 can be omitted.

In the illustrative embodiment, the yoke bracket 20 further includes a support-top height adjuster 110 interconnecting the left and right coupling members 102, 104 to the support top 14 as shown in FIG. 2. The support-top height adjuster 110 is configured to engage selectively with one of the attachment holes 106, 108 formed in the left and right coupling members 102, 104 to establish a selected height of the support top 14 from the ground.

The support-top height adjuster 110 includes a carriage assembly 112 movable slidably along the left and right coupling members 102, 104, a left height-adjustment handle 114 coupled to a left side 112L of the carriage assembly 112, and a right height-adjustment handle 116 coupled to a right side 112R of the carriage assembly 112 as shown in FIG. 2. The carriage assembly 112 supports the motion coupler 218 on the yoke bracket 20. The left and right height-adjustment handles 114, 116 can be actuated by a user to unlock the carriage assembly for up-and-down movement along the left and right coupling members 102, 104.

Figure 3:
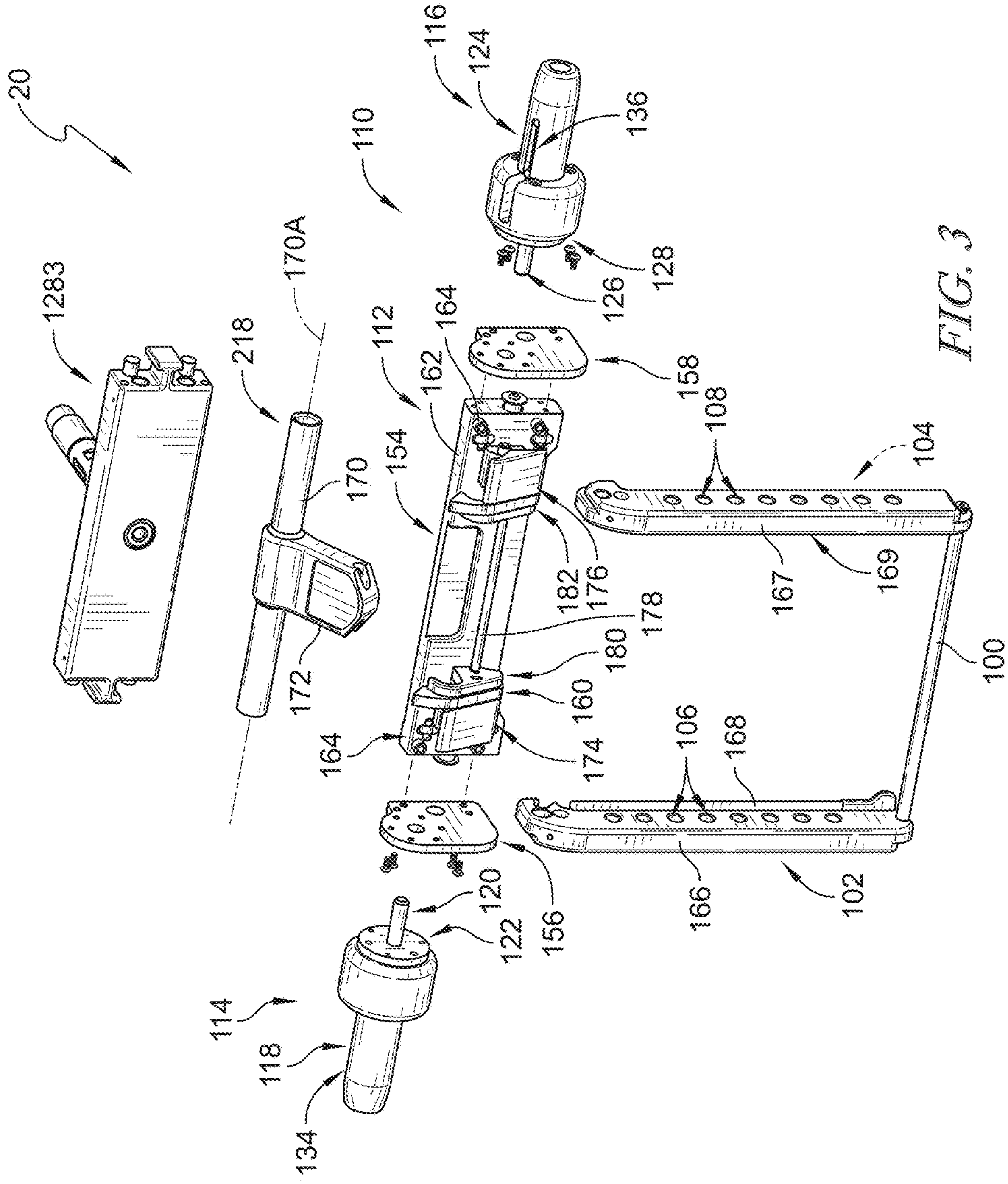
FIG. 3 is an exploded assembly view of the yoke bracket from FIG. 2.

The first height-adjustment handle includes a first handgrip 118, a first lock pin 120 fixed to the first handgrip 118 for movement therewith, and a first guide shaft 122 fixed to the carriage assembly 112 as shown in FIGS. 2 and 3. The first handgrip 118 is configured to be grasped by a user to move the carriage assembly up or down along the left and right coupling members 102, 104. The first lock pin 120 is normally received in one of the attachment holes 106 of the left coupling member 102 to block movement of the carriage assembly 112. The first guide shaft 122 is fixed to the carriage assembly 112 and guides movement of the first lock pin 120 from the locked position to an unlocked position so that a height of the carriage assembly 112 and the support top 14 can be adjusted.

Like the first height-adjustment handle 114, the second adjustment handle 116 includes a second handgrip 124, a second lock pin 126 fixed to the second handgrip 124 for movement therewith, and a second guide shaft 128 fixed to the carriage assembly 112 as shown in FIGS. 2 and 3. The second handgrip 124 is configured to be grasped by a user to move the carriage assembly up or down along the left and right coupling members 102, 104. The second lock pin 126 is normally received in one of the attachment holes 108 of the right coupling member 104 to block movement of the carriage assembly 112. The second guide shaft 128 is fixed to the carriage assembly 112 and guides movement of the second lock pin 124 from the locked position to an unlocked position so that a height of the carriage assembly 112 and the support top 14 can be adjusted.

Figure 4:
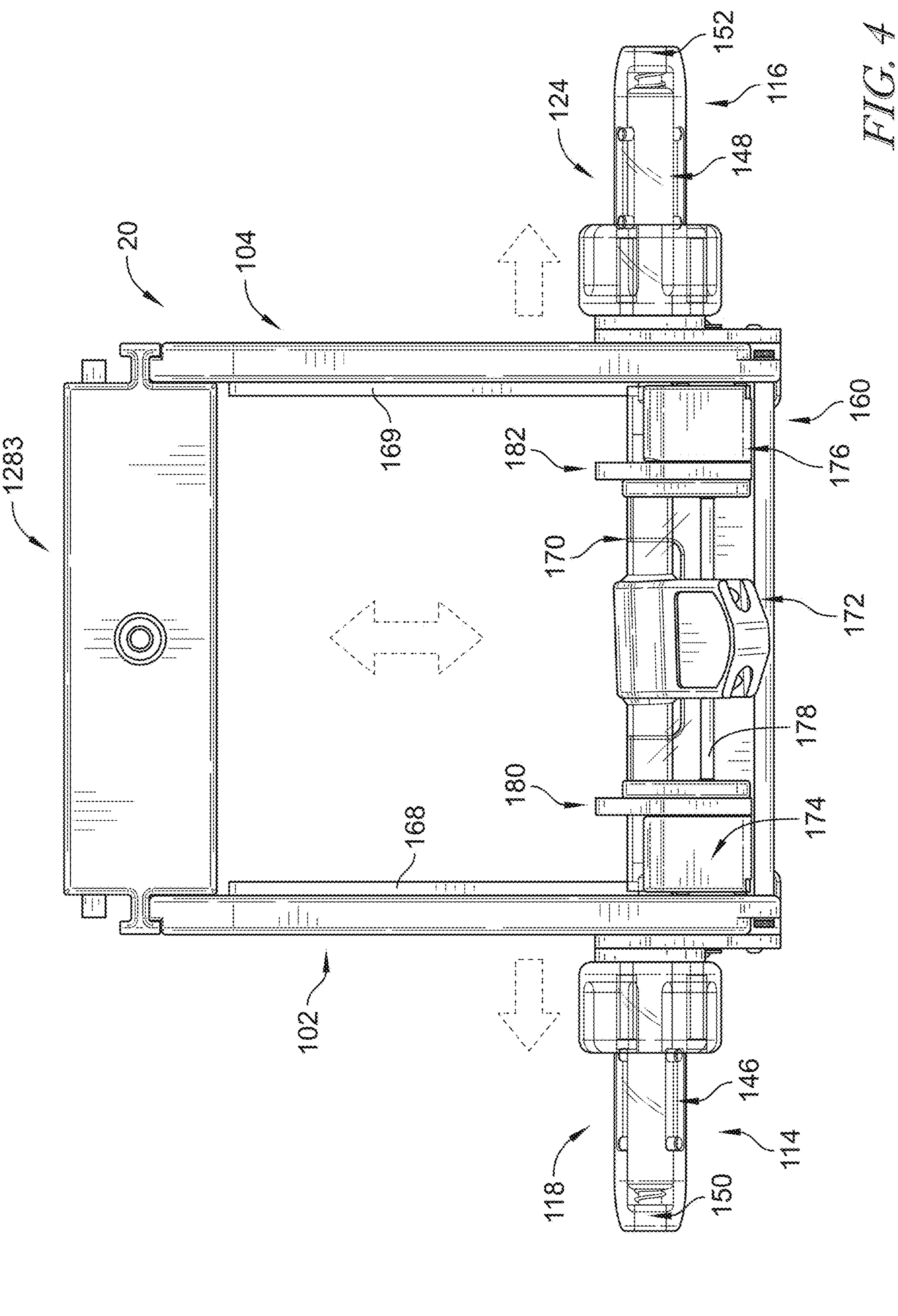
FIG. 4 is a front elevation view of the yoke bracket from FIG. 2 showing a pair of height adjustment handles in locked, unactuated positions.
Figure 5:
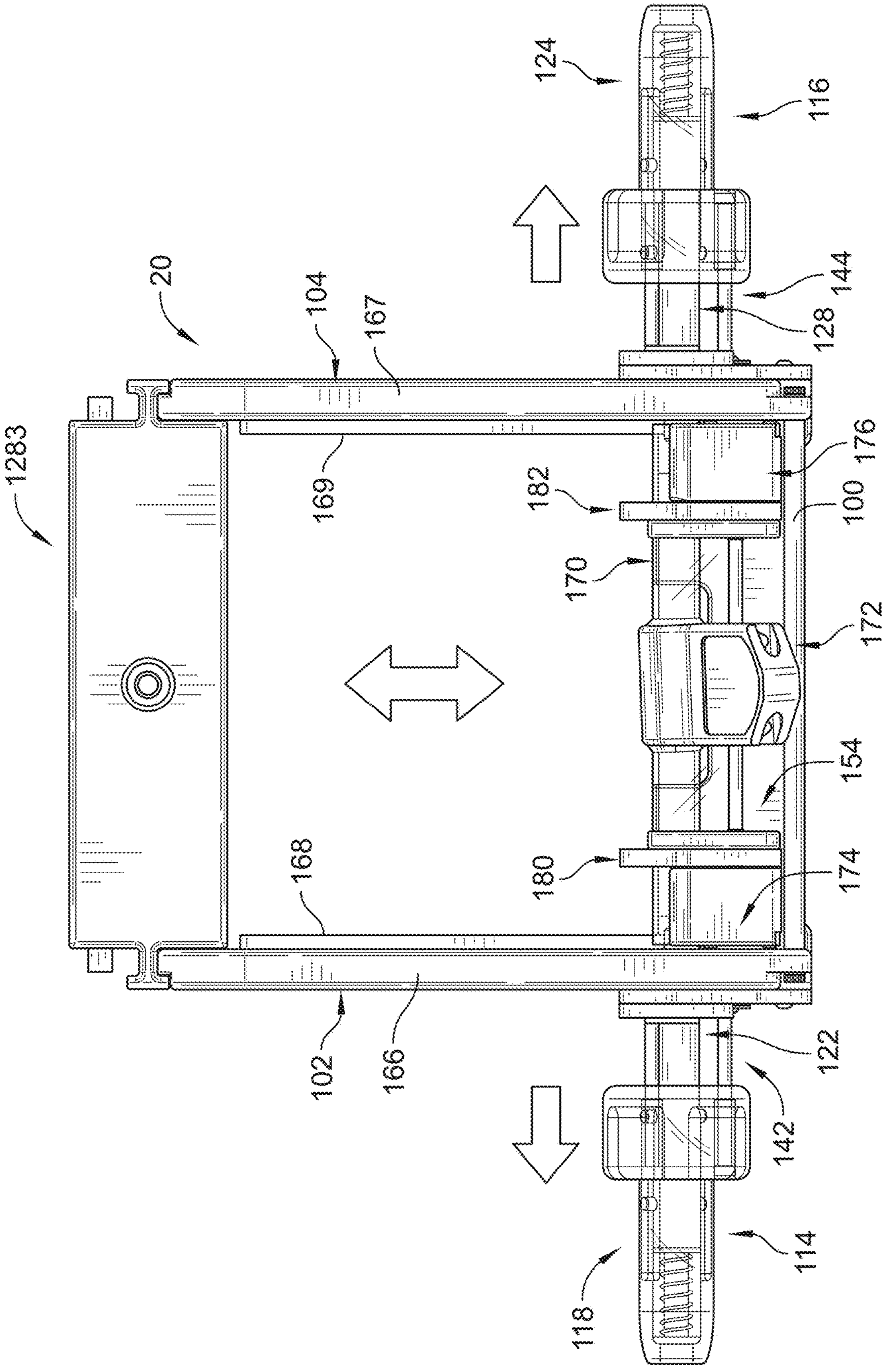
FIG. 5 is a front elevation view of the yoke bracket from FIG. 4 showing the height adjustment handles in an unlocked, actuated position.

The left and right height-adjustment handles 114, 116 are movable from a locked position, as shown in FIG. 4, to an unlocked position, as shown in FIG. 5. In the locked position, the lock pins 120, 126 of the left and right height-adjustment handles 114, 116 extend into a respective one of the attachment holes 106, 108 formed in the left and right coupling members 102, 104 to retain the support top 14 at the selected height. In the unlocked position, the lock pins 120, 126 of the left and right height-adjustment handles 114, 116 are removed from the attachment holes 106, 108 of both the left and right coupling members 102, 104 so that the carriage assembly 112 and at least a portion of the support top 14 is movable together upwardly or downwardly along the left and right coupling members 102, 104 of the yoke bracket 20 to a different selected height.

The first and second guide shafts 122, 128 are received in respective shaft passageways 130, 132 formed in the first and second handgrips 118, 124. As shown in FIGS. 4 and 5, the first and second handgrips 118, 124 are configured to move outwardly away from one another to withdraw the first and second lock pins 120, 126 from the attachment holes 106, 108 formed in the left and right coupling members 102, 104. The guide shafts 122, 128 of each height-adjustment handle 114, 116 guide sliding movement of the handgrips 118, 124 through the shaft passageways 130, 132 between the locked and unlocked positions.

Figure 6:
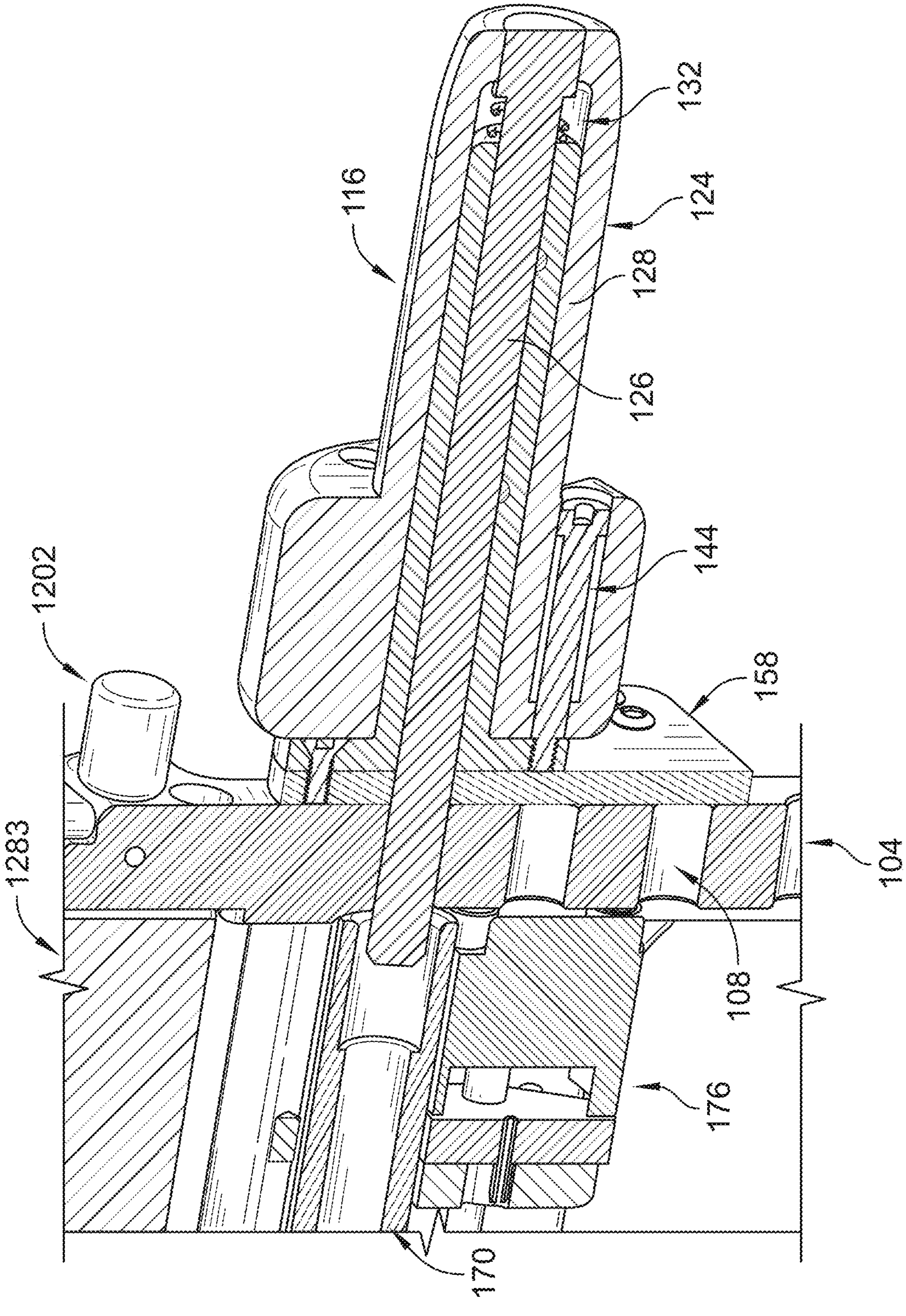
FIG. 6 is an enlarged cross-sectional and perspective view of one of the height adjustment handles from FIGS. 4 and 5 in the locked position.
Figure 7:
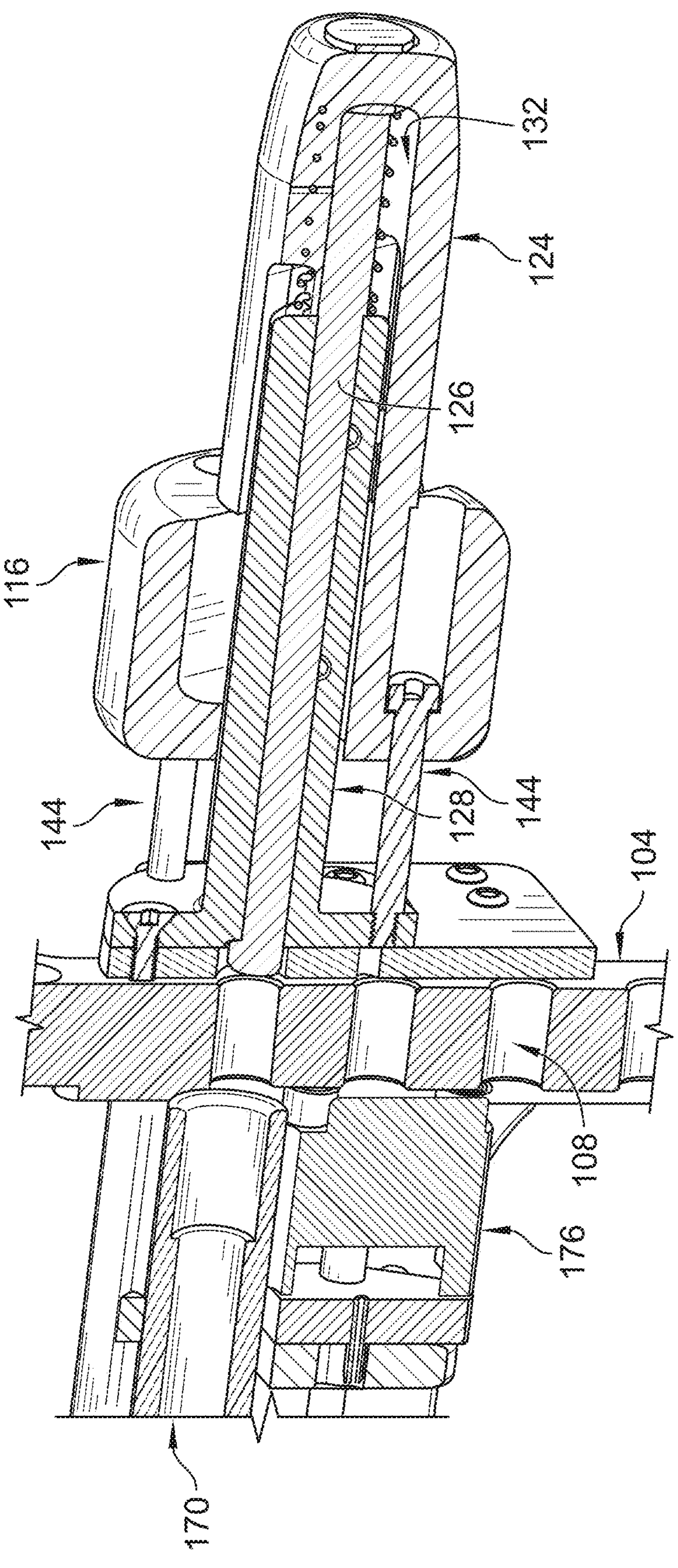
FIG. 7 is an enlarged cross-sectional and perspective view of one of the height adjustment handles from FIGS. 4 and 5 in the unlocked position.

Each handgrip 118, 124 is formed to include a guide slot 134, 136 opening into each respective shaft passageway 130, 132 as shown in FIGS. 3 and 6. The first guide shaft 122 includes at least one guide pin 138 extending radially outward and into the guide slot 134 formed in the first handgrip 118 and the second guide shaft 128 includes at least one guide pin 140 extending radially outward and into the guide slot 136 formed in the second handgrip 124. The guide pins 138, 140 block rotation of the left and right handgrips 118, 124 about a longitudinal axis of the lock pins 120, 126. The first and second height-adjustment handles 114, 116 further include a plurality of peripheral support rods 142, 144 spaced circumferentially around each respective guide shaft 122, 128. The plurality of peripheral support rods extend into respective passageways formed in each respective handgrip 118, 124. In some embodiments, the guide pins 138, 140 and/or the support rods 142, 144 may be omitted.

Each of the lock pins 120, 126 extends through a respective pin-receiving slot 146, 148 formed in each respective guide shaft 122, 128 as shown in FIGS. 4 and 6. Each of the lock pins 120, 126 includes a retainer head 150, 152 which is engaged by each respective handgrip 118, 124 to move outwardly away from one another when a user grasps the handgrips 118, 124 and pulls outwardly. The first and second lock pins 120, 126 are biased toward one another to automatically extend though a respective attachment hole 106, 108 to the locked position when the left and right handgrips 118, 124 are released by the user.

The carriage assembly 112 includes a cross beam 154, first and second handle mounts 156, 158 coupled to the cross beam 154, and a table mount assembly 160 as shown in FIG. 3. The cross beam 154 interconnects the left and right coupling members 102, 104. The first handle mount 156 is coupled to a left side of the cross beam 154 and the left height-adjustment handle 114. The second handle mount 158 is coupled to a right side of the cross beam 154 and the right height-adjustment handle 116. The table mount assembly 160 is coupled to the cross beam 154 inwardly between the left and right coupling members 102, 104 and is configured to receive the motion coupler 218 to mount the support top 14 to the carriage assembly 112.

The cross beam 154 includes a beam body 162 and a plurality of rollers 164 coupled to the beam body 162 as shown in FIGS. 3 and 4. The beam body 162 extends between the left and right coupling members 102, 104. The plurality of rollers 164 are configured to engage and roll along the left and right coupling members 102, 104 to guide upward and downward movement of the carriage assembly 112 along the left and right coupling members 102, 104.

The left and right coupling members 102, 104 each include a coupling member body 166, 167 which is formed to include the number of attachment holes 106,108 and a coupling member flange 168, 169 spaced apart from the number of attachment holes 106, 108 as shown in FIG. 3. The coupling member flanges 168, 169 extend inwardly toward one another. The plurality of rollers 164 are configured to engage and roll along each respective coupling member flange 168, 169.

The motion coupler 218 includes a connector beam 170 arranged to lie between the left and right coupling members 102, 104 and a connector arm 172 coupled to the connector beam 170 and arranged to engage and support the support top 14 as shown in FIGS. 3 and 4. The connector beam 170 is a tubular member and is formed to include opposing pin-receiving slots at opposite ends thereof. Each pin-receiving slot is configured to receive a respective lock pin when the height-adjustment handles are in the locked position. The connector arm 172 is pivotable about an axis 170A extending longitudinally through the connector beam 170 to adjust an inclination angle of the support top 14.

The table mount assembly 160 is configured to removably engage the connector beam 170 to retain the connector beam 170 to the table mount assembly 160. The table mount assembly 160 includes a left and right connector-beam supports 174, 176 fixed to the cross beam 154, a pivot shaft 178 interconnecting the left and right connector-beam supports 174, 176, and a first pair of attachment hooks 180, 182 coupled to the pivot shaft 180 and configured to engage the connector beam 170 to retain the support top 14 to the carriage assembly 112 as shown in FIGS. 2 and 3. The attachment hooks 180, 182 are pivotable about the pivot shaft 178 from a locked position blocking separation of the motion coupler 218 and the support top 14 from the carriage assembly 112 and a released position spaced from the connector beam 170 to allow separation of the connector beam 170 and the connector arm 172 from the table mount assembly 160.

Figure 8:
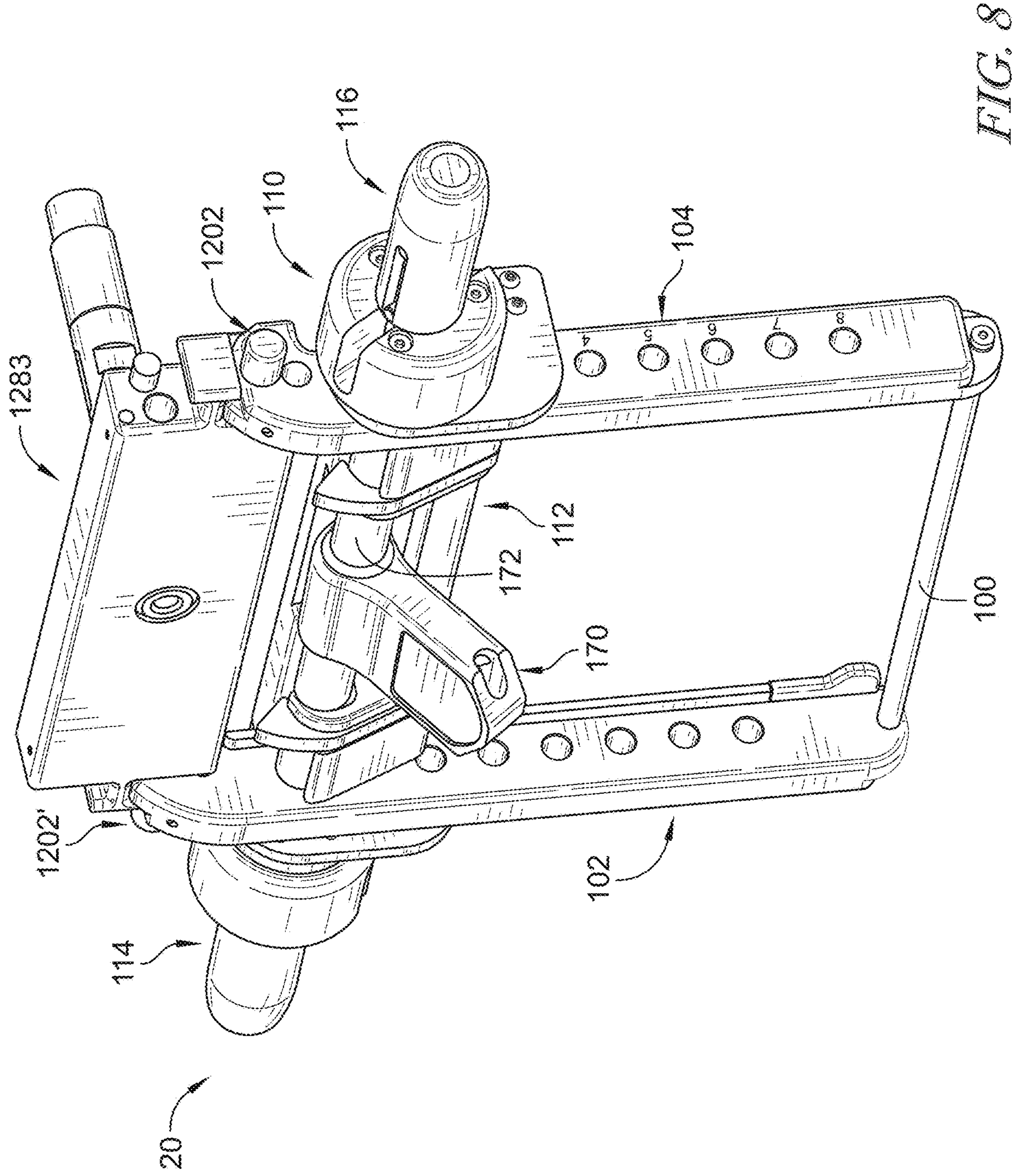
FIG. 8 is another perspective view of the yoke bracket from FIG. 2 showing the yoke bracket attached to a connector block included in the foundation frame of the patient support apparatus.
Figure 9:
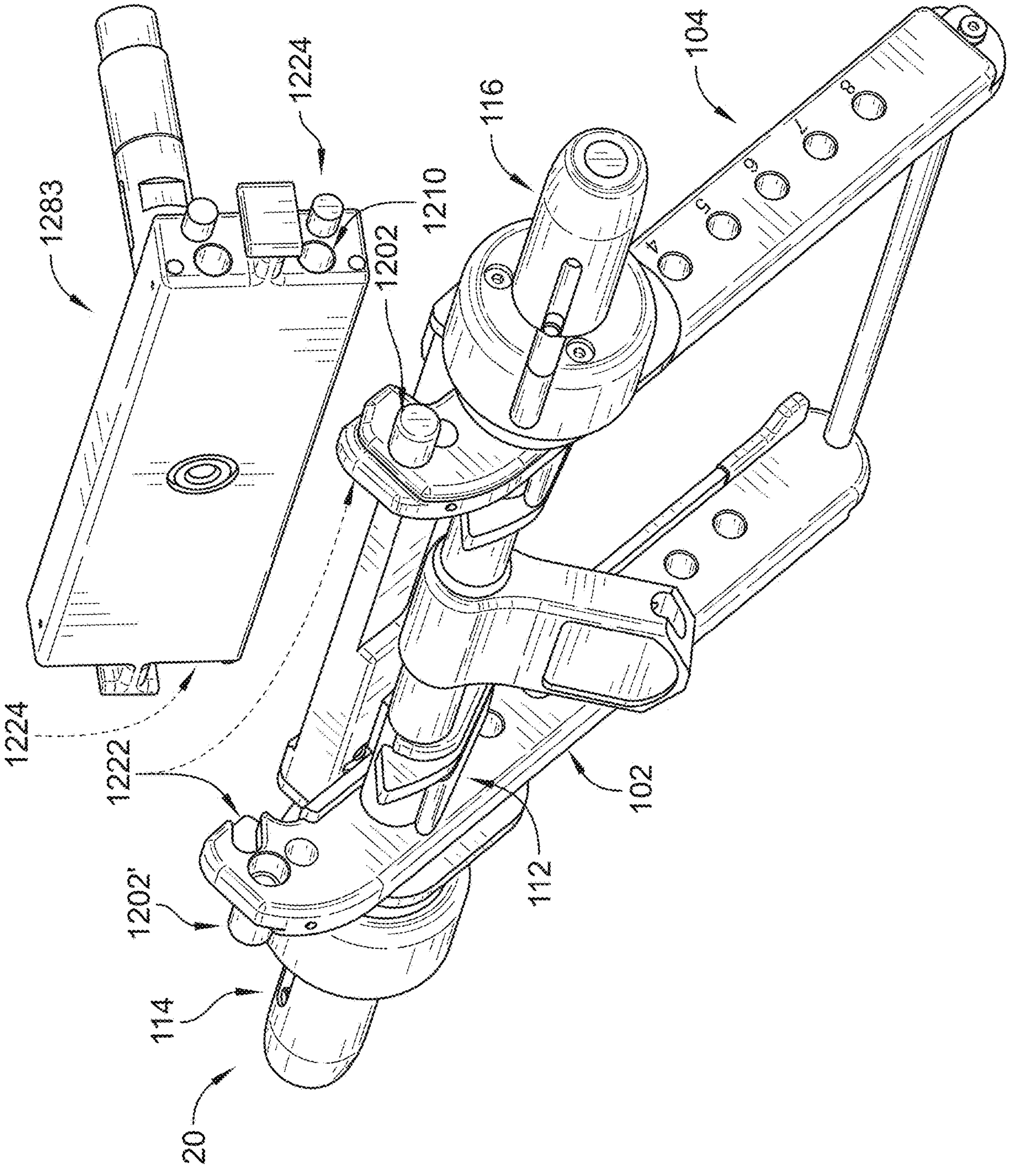
FIG. 9 is a perspective view of the yoke bracket from FIG. 8 showing the yoke bracket separated from the connector block.

At least one of the first column and the second column 24, 26 includes a connector block 1283 coupled to the yoke bracket 20 to support the yoke bracket on the column(s) 24, 26 and a bracket retention system 1200 configured to retain the yoke bracket 20 to the connector block 1283 as shown in FIGS. 8 and 9. The bracket retention system 1200 includes a lock pin 1202, a first detent pin 1204 fixed to the connector block 1283, and a second detent pin 1206 fixed to at least one of the left and right coupling members 102, 104 with the lock pin 1202. The lock pin 1202 is movable between a locked position and an unlocked position to allow separation of the yoke bracket 20 from the connector block 1283.

In the locked position, the lock pin 1202 is received within a throughhole 1208 formed in one of the left and right coupling members 102, 104 and a blind hole 1210 formed in the connector block 1283 as shown in FIGS. 8 and 9. In the locked position, the lock pin 1202 engages the first detent pin 1204 to block sliding movement of the lock pin 1202 to the unlocked position. In the unlocked position, the lock pin 1202 is removed from the blind hole 1210 formed in the connector block 1283 and engages the second detent pin 1206 to block sliding movement of the lock pin 1202 to the locked position.

Figure 10:
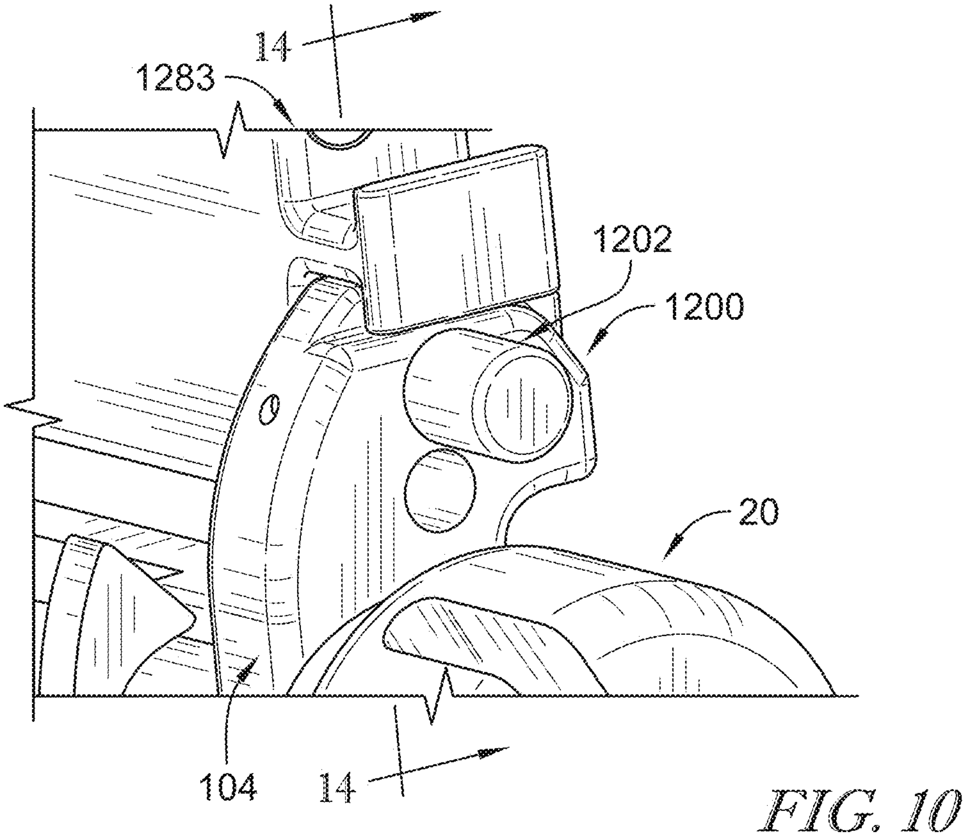
FIG. 10 is an enlarged perspective view of a bracket retention system configured to retain the yoke bracket to the connector block in a locked position.
Figure 11:
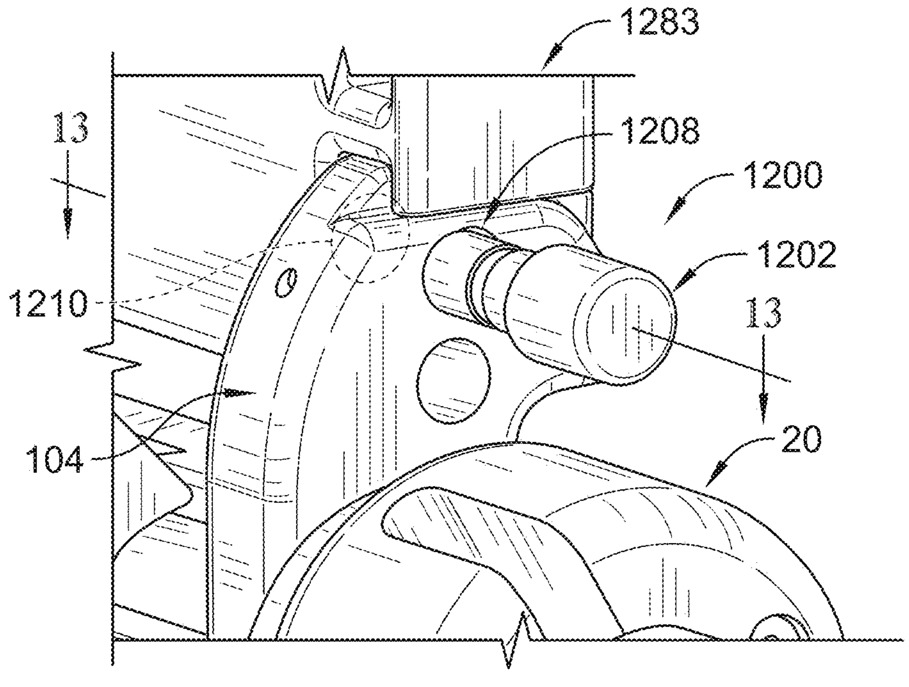
FIG. 11 is an enlarged view similar to FIG. 10 showing the bracket retention system in an unlocked position.
Figure 12:
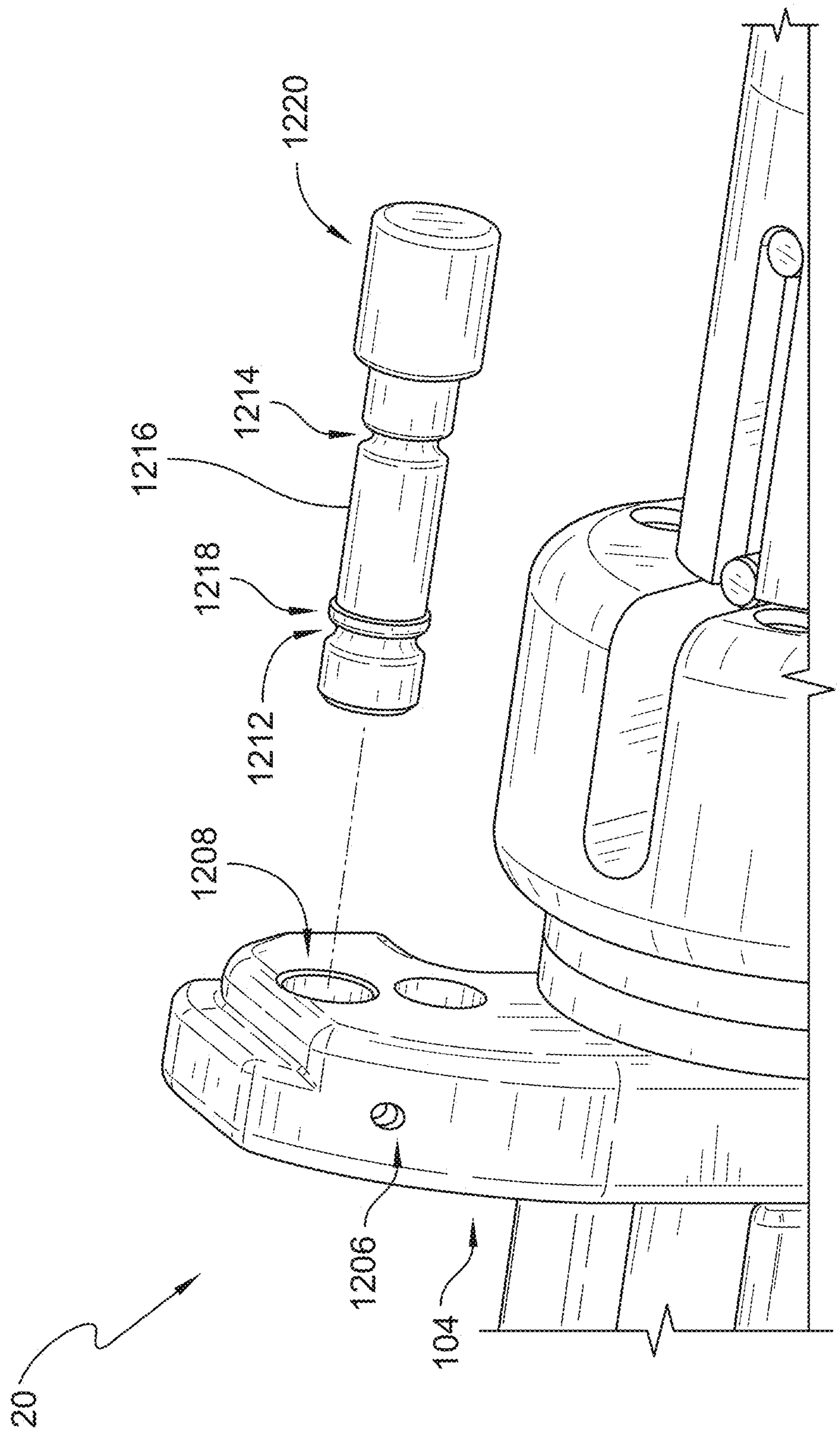
FIG. 12 is an exploded assembly view showing the bracket retention system of FIGS. 10 and 11.

The lock pin 1202 is formed to include a first detent channel 1212 and a second detent channel 1214 as shown in FIGS. 10 and 11. The first detent pin 1204 is configured to extend into the first detent channel 1212 and the second detent pin 1206 is configured to extend into the second detent channel 1214 in the locked position. The second detent pin 1206 is configured to extend in to the first detent channel 1212 in the unlocked position. In this way, the dual detent pins 1212, 1214 cooperate to block unintentional removal of the lock pin 1202 from the connector block 1283.

Figure 13:
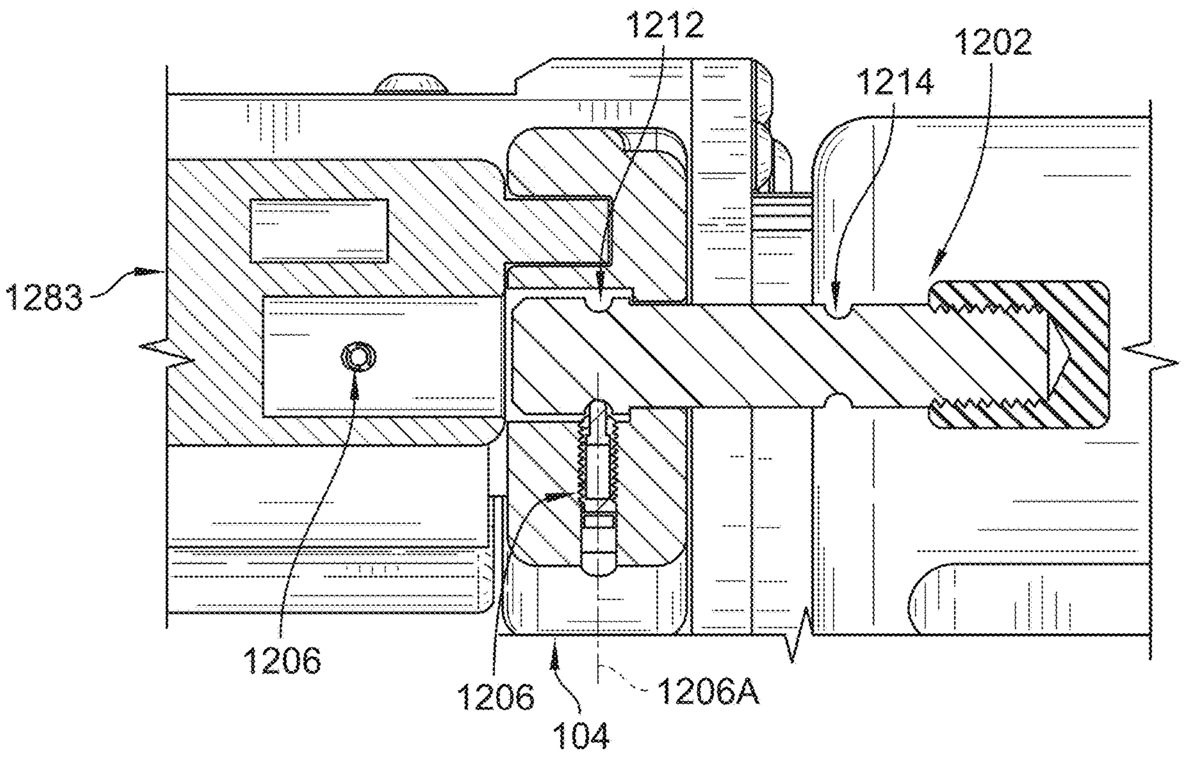
FIG. 13 is a cross section of the bracket retention system.
Figure 14:
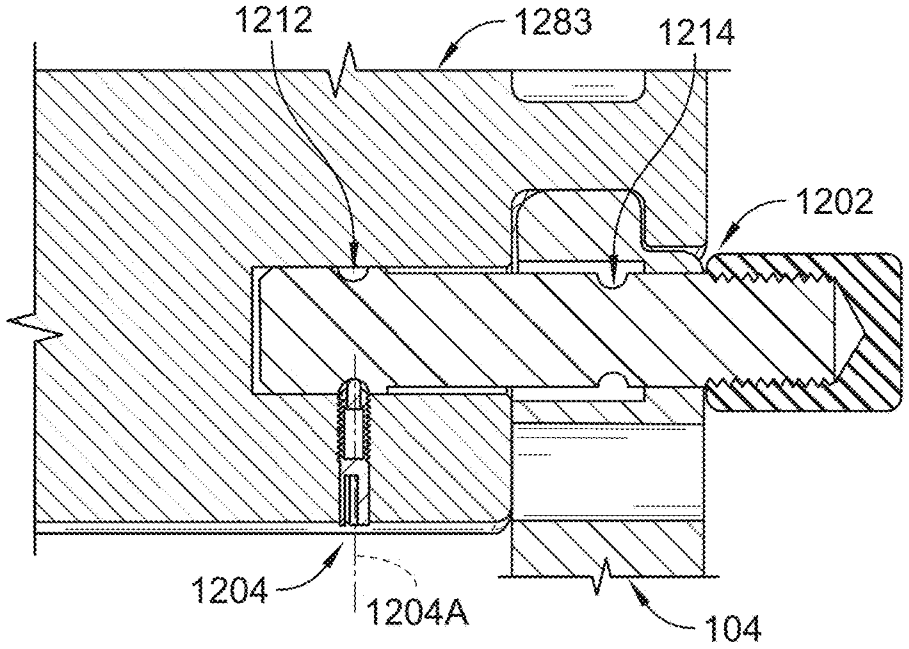
FIG. 14 is another cross section of the bracket retention system.
Figure 15:
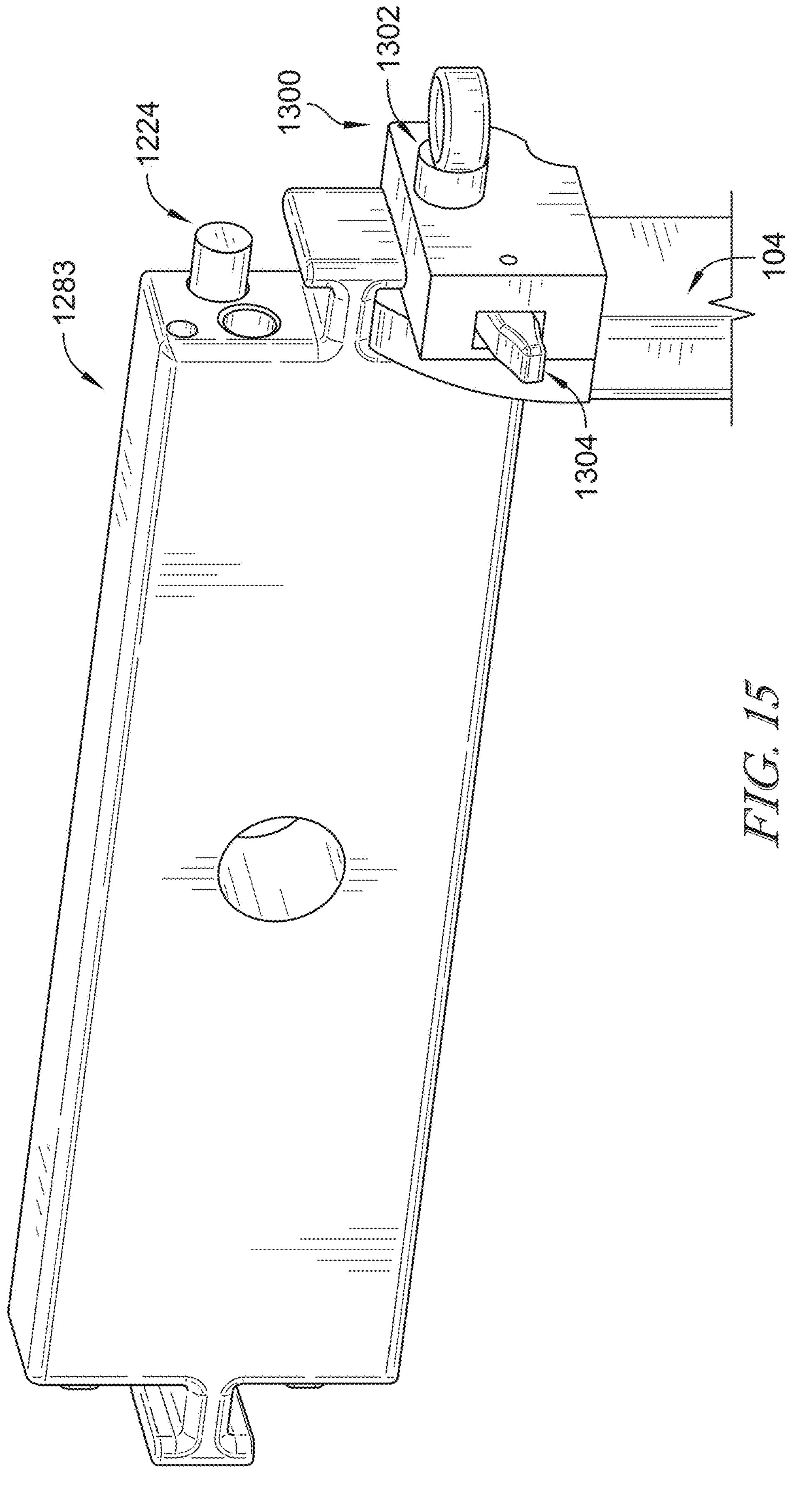
FIG. 15 is a perspective view showing another embodiment of a bracket retention system that can be used with the yoke bracket of the patient support apparatus.
Figure 16:
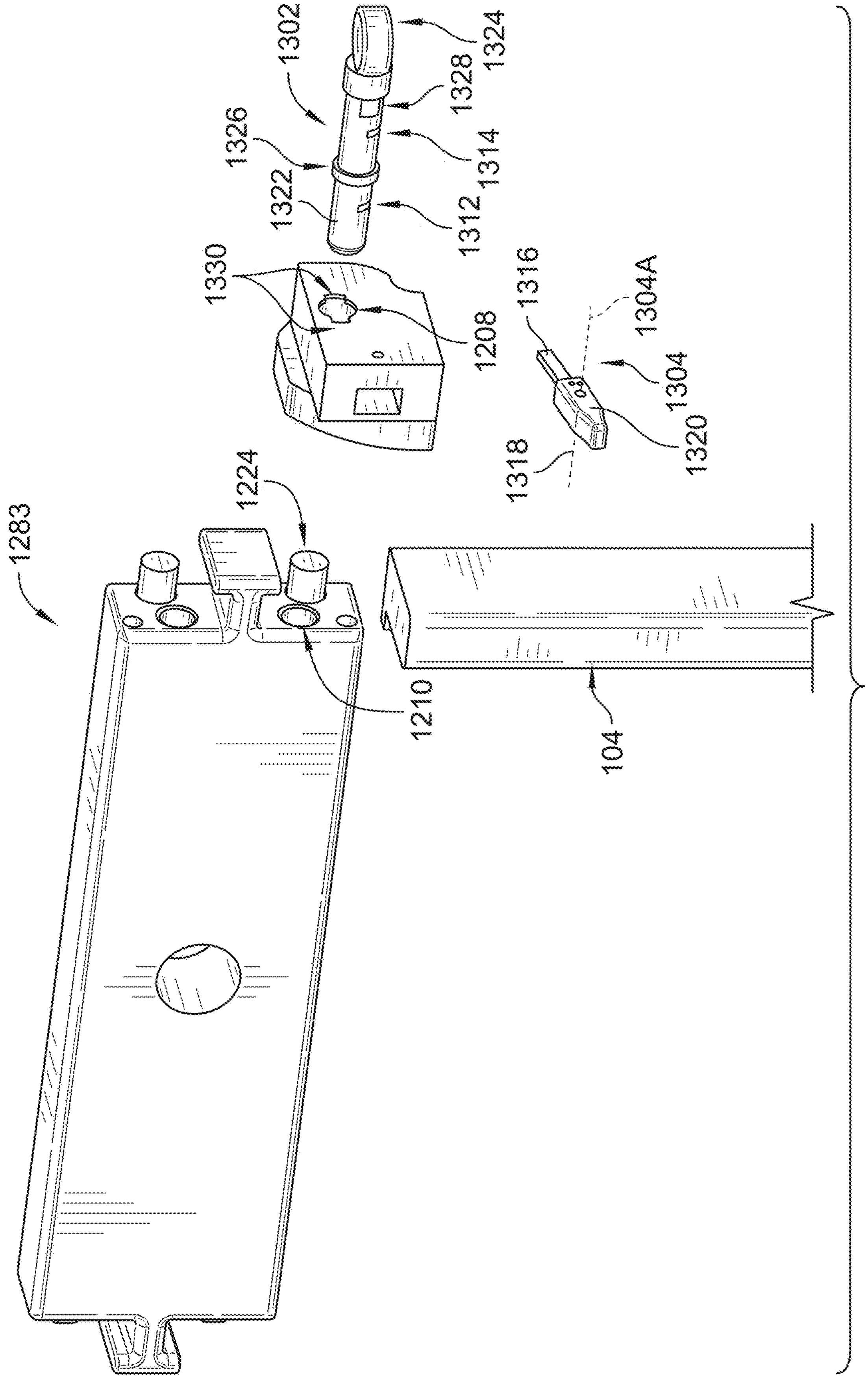
FIG. 16 is an exploded assembly view of the bracket retention system from FIG. 15.
Figure 17:
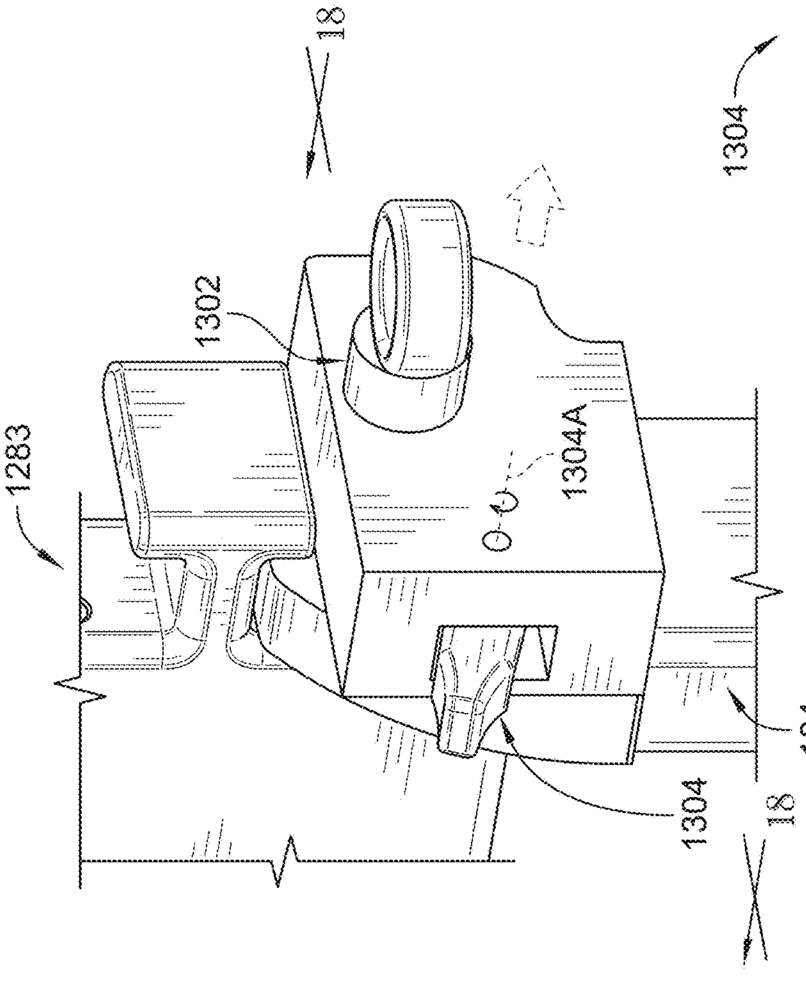
FIG. 17 is an enlarged perspective view of the bracket retention system from FIG. 15 in a locked position.
Figure 18:
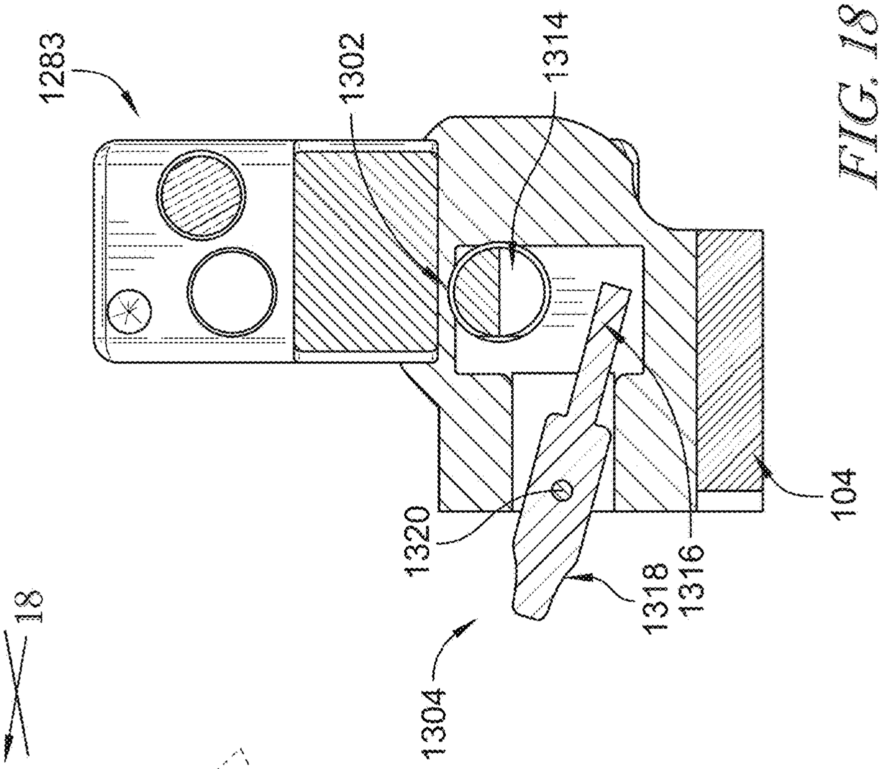
FIG. 18 is a cross section taken along line 18-18 in FIG. 17.
Figure 19:
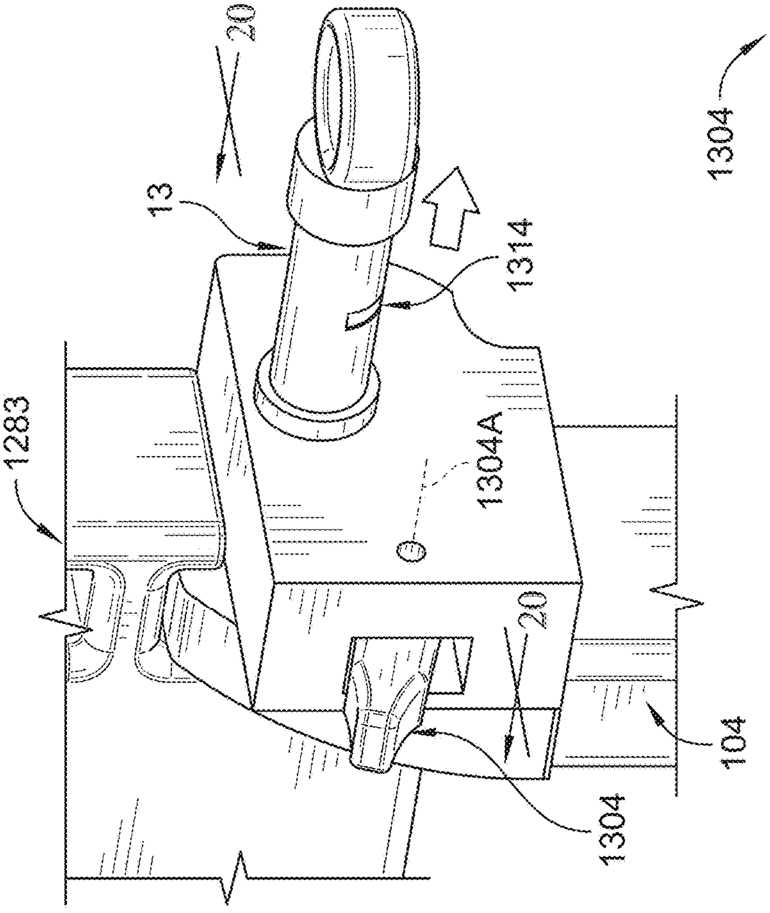
FIG. 19 is an enlarged perspective view of the bracket retention system from FIG. 15 in an unlocked position.
Figure 20:
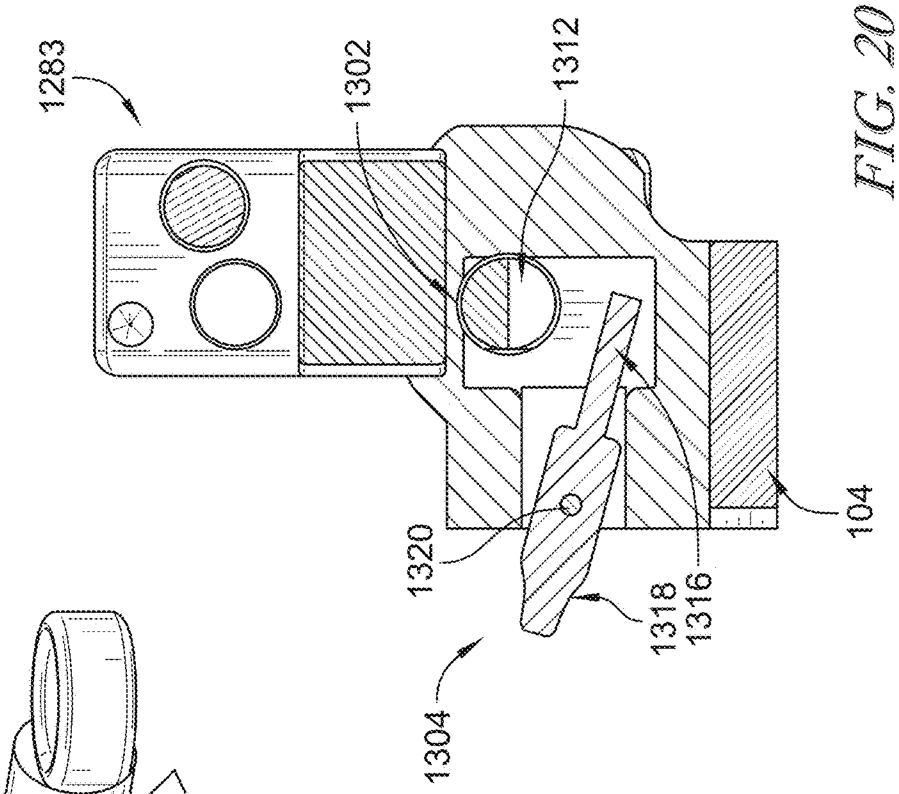
FIG. 20 is a cross section taken along line 20-20 in FIG. 19.
Figure 22:
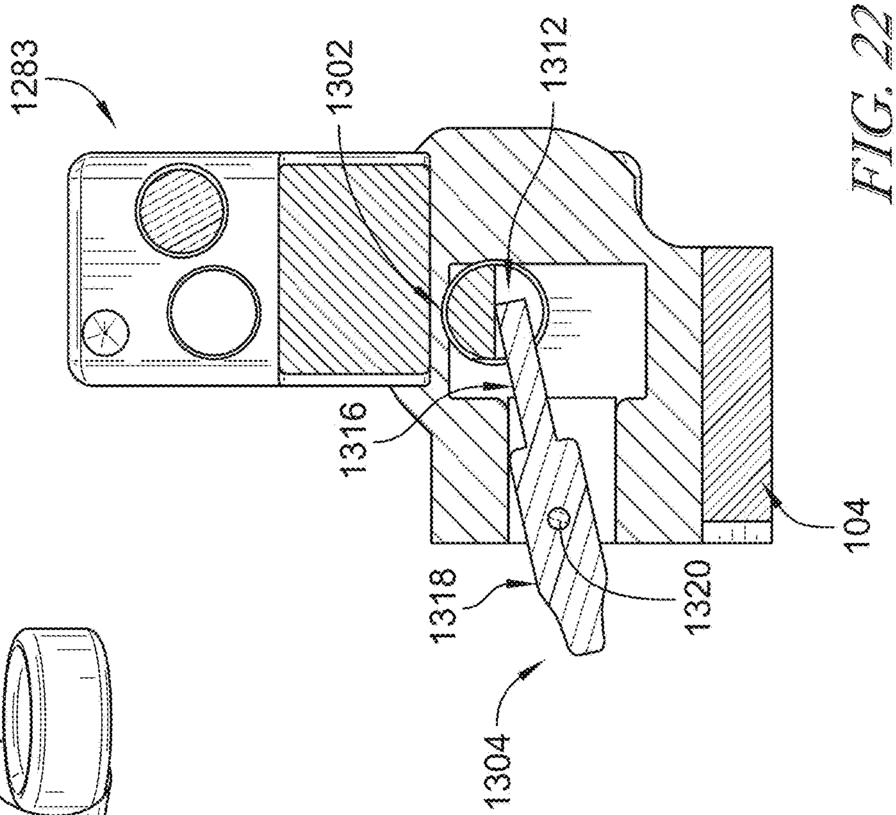
FIG. 22 is a cross section taken along line 22-22 in FIG. 21.
Figure 21:
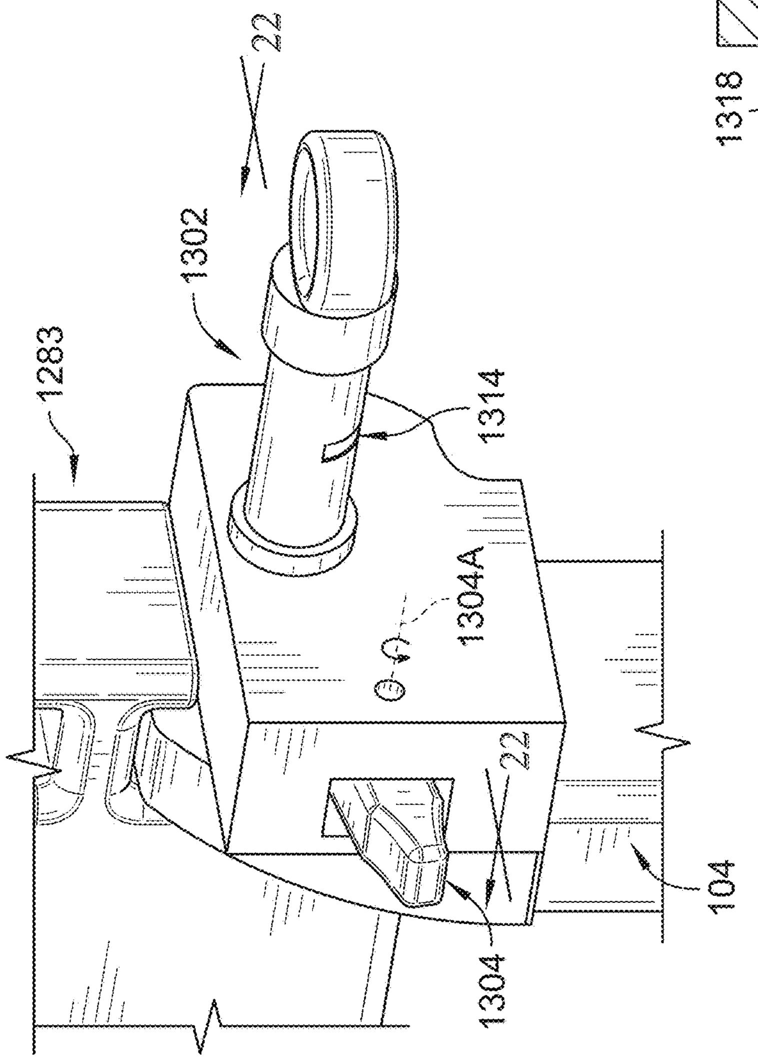
FIG. 21 is an enlarged perspective view of the bracket retention system from FIG. 15 in the unlocked position.

The first detent pin 1204 extends along a first axis 1204A and engages the lock pin 1202 at a first circumferential orientation relative to the lock pin 1202 as shown in FIGS. 13 and 14. The second detent pin 1206 extends along a second axis 1206A and engages the lock pin 1202 at a second circumferential orientation relative to the lock pin 1202. The second circumferential orientation is different than the first circumferential orientation relative to a circumference of the lock pin 1202.

The lock pin 1202 includes a pin shaft 1216 formed with the first and second detent channels 1212, 1214, a retainer ring 1218 arranged to lie between the first and second detent channels 1212, 1214, and a pin head 1220 arranged outside of the throughhole 1208 and the blind hole 1210. The pin head 1220 is configured to be gripped by a user to move the lock pin 1202 between the locked position and the unlocked position. It should be appreciated that the lock pin 1202 may be referred to as a first lock pin 1202 that extends through the right coupling member 104 and into a right side of the connector block 1283 and the bracket retention system 1200 may further include a second lock pin 1202' that extends through the left coupling member 102 and into a left side of the connector block 1283. In some embodiments, only a single pin 1202, 1202' may be used. The first and second lock pins 1202, 1202' each extend only partway through the connector block 1283 in the locked position.

Each coupling member 102, 104 is formed to include a retainer slot 1222 and the connector block 1283 includes a retainer pin 1224 on both the left and right sides thereof. Each of the retainer pins 1224 is configured to extend into a respective retainer slot 1222 to couple the yoke bracket 20 to the connector block 1283 until the lock pin(s) 1202 are moved to the locked position. In some embodiments, the lock pin(s) 1202 may be biased to extend automatically into the blind hole 1210 when the yoke bracket 20 is attached to the connector block 1283.

Another illustrative embodiment of a bracket retention system 1300 is shown in FIGS. 15-22. The bracket retention system 1300 includes a lock pin 1302 movable between a locked position and an unlocked position and a pin latch 1304 movable relative to the lock pin between a latched position and an unlatched position. In the locked position, the lock pin 1302 is received within the throughhole 1208 formed in at least one of the left and right coupling members 102, 104 and the blind hole 1210 formed in the connector block 1283. In the locked position, the pin latch 1304 engages the lock pin 1302 to block sliding movement of the lock pin 1302 to the unlocked position. In the unlocked position, the lock pin 1302 is removed from the blind hole 1210 formed in the connector block 1283. The pin latch 1304 may also engage the lock pin 1302 to block sliding movement of the lock pin 1302 to the locked position.

The lock pin 1302 is formed to include a first channel 1312 and a second channel 1314 spaced apart from the first channel 1312. The pin latch 1304 is configured to extend into the second channel 1314 when the lock pin 1302 is in the locked position. The pin latch 1304 extends into the second channel 1314 when the lock pin 1302 is in the unlocked position.

The first and second channels 1312, 1314 are formed only partway around a circumference of the lock pin 1302. Illustratively, the first and second channels 1312, 1314 are formed about halfway around a circumference of the lock pin 1302. The first and second channels 1312, 1314 are aligned with one another in a longitudinal direction of the lock pin 1302 to accept the pin latch 1304 at the same circumferential orientation.

The pin latch 1304 includes a latch bar 1316 configured to extend into one of the first and second channels 1312, 1314 to block sliding movement of the lock pin 1302 between the locked and unlocked positions and a latch handle 1318 configured to be moved by a user to change the pin latch 1304 between the latched position and the unlatched position. In the latched position, the latch bar 1316 extends into one of the first and second channels 1312, 1314 of the lock pin 1302. In the unlatched position, the latch bar 1316 is removed from the first and second channels 1312, 1314 and the lock pin 1302 is free to slide relative to the connector block 1283 between the locked and unlocked positions.

The pin latch 1304 further includes a latch pivot axle 1320 that extends through at least one of the latch bar 1316 and the latch handle 1318 and into the one of the left and right coupling members 102, 104. The latch pivot axle 1320 is configured to control pivotable movement of the pin latch 1304 about a latch pivot axis 1304A between the latched and unlatched positions. The latch bar 1316 is biased toward the latched position to automatically extend into one of the first and second channels 1312, 1314 when the lock pin 1302 is in the locked position or the unlocked position.

The lock pin 1302 includes a pin shaft 1322 that is formed to include the first and second channels 1312, 1314, an eyelet 1324 coupled to a distal end of the pin shaft 1320, and a retainer ring 1326 coupled to the pin shaft 1322. The pin shaft 1322 extends only partway through the connector block 1283. The eyelet 1324 is configured to be gripped by a user to withdraw the lock pin 1302 from the blind hole 1210 formed in the connector block 1283. The retainer ring 1326 is coupled to an outer surface of the pin shaft 1302 between the first and second channels 1312, 1314 and is configured to retain the lock pin 1302 to the one of the left and right coupling members 102, 104 in the unlocked position.

The retainer ring 1326 is configured to engage a portion of the connector block 1283 or the coupling member 104 in the locked position to align the second channel 1314 with the pin latch 1304. The retainer ring 1326 is configured to engage a portion of the coupling member 104 in the unlocked position to align the first channel 1312 with the pin latch 1304. The lock pin 1302 may further include a key 1328 coupled to the outer surface of the pin shaft 1322 and the throughhole 1208 may be formed to include a notch 1330 that matches and receives the key 1328. The key 1328 interacts with the notch 1330 to block misalignment of the channels 1312, 1314 with the pin latch 1304 in the locked and unlocked positions.

Figure 23:
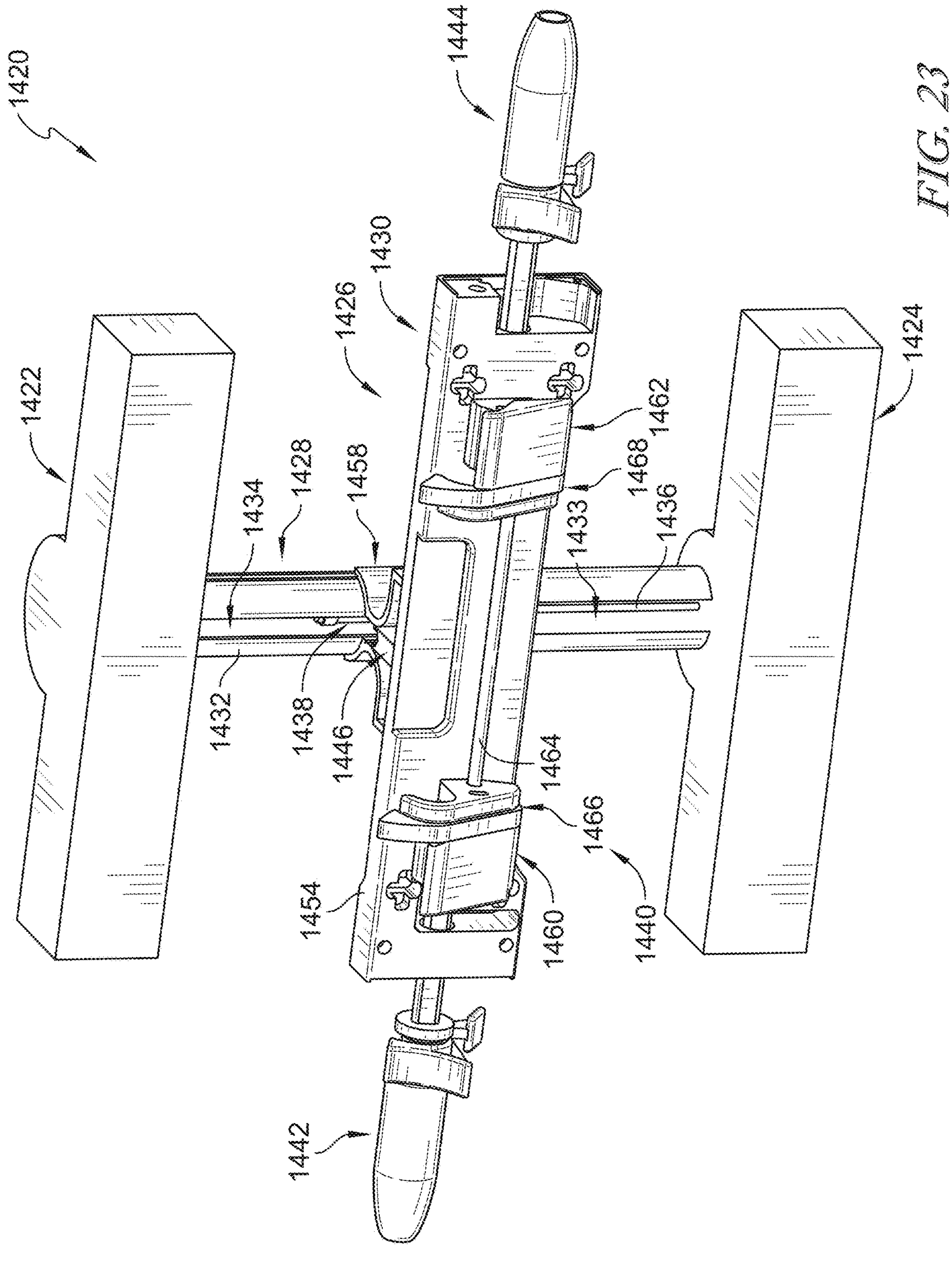
FIG. 23 is a perspective view of another embodiment of a yoke bracket that can be used with the patient support apparatus of FIG. 1.
Figure 24:
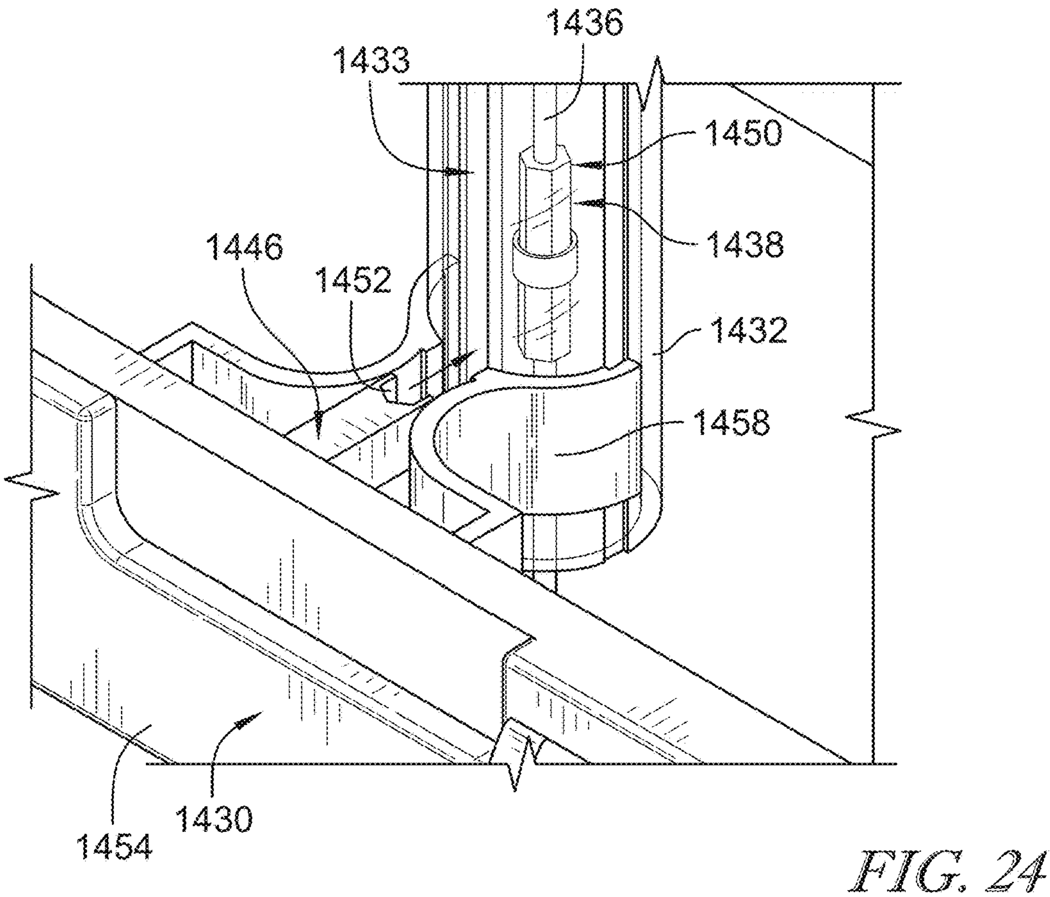
FIG. 24 is an enlarged view of a portion of the yoke bracket from FIG. 23 in a locked position.
Figure 25:
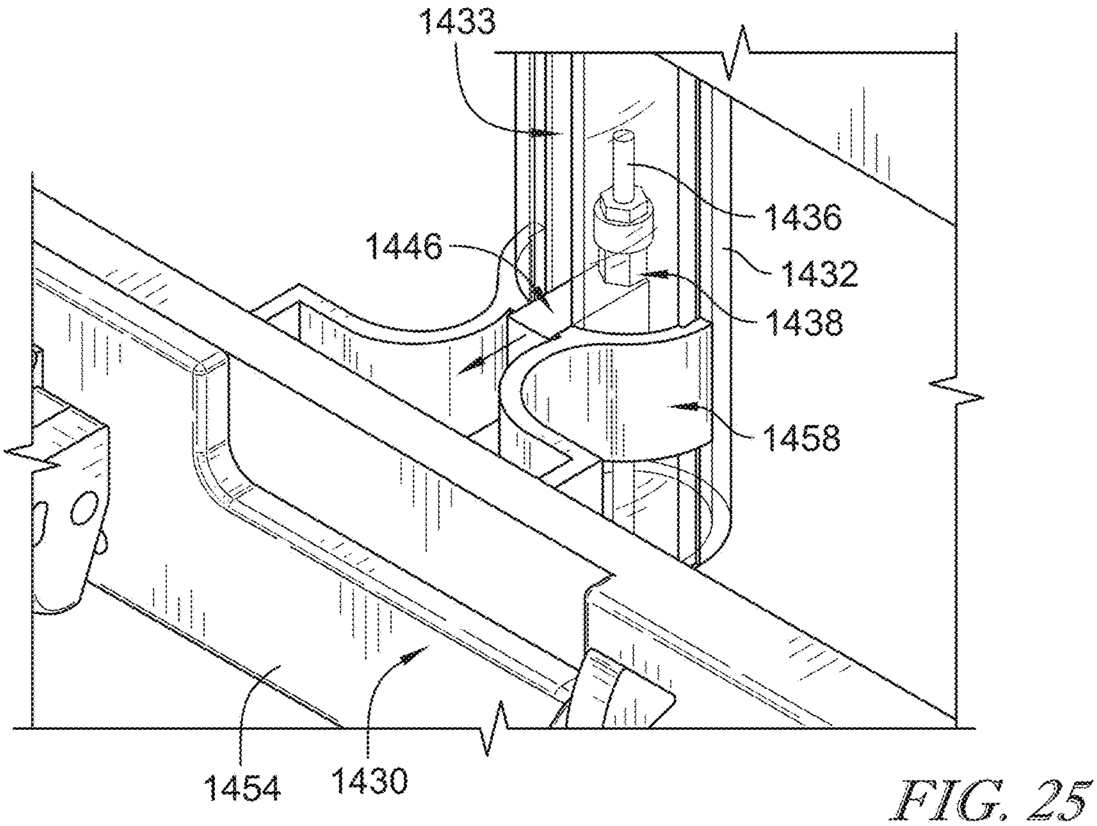
FIG. 25 is an enlarged view of a portion of the yoke bracket from FIG. 23 in an unlocked position.

Another embodiment of a yoke bracket 1420 that can be used with surgical table 10 and with bracket retention system 1200 or 1300 is shown in FIGS. 23-25. The yoke bracket 1420 includes an upper base member 1422, a lower base member 1424 spaced vertically from the upper base member 1422, and a support-top height adjuster 1426 interconnecting the upper and lower base members 1422, 1424 to the support top 14 and configured to establish a selected height of the support top 14 from the ground.

The support-top height adjuster 1426 includes a guide member 1428 interconnecting the upper and lower base members 1422, 1424 and a carriage assembly 1430 coupled to the support top 14 and movable slidably along the guide member 1428. The guide member 1428 is configured to control upward and downward movement of the carriage assembly 1430 and the support top 14 between the upper and lower support members 1422, 1424. The carriage assembly 1430 supports the support top 14 and can be locked at a plurality of positions along the guide member 1428 to support the support top 14 at the selected height.

The guide member 1428 includes an outer sleeve 1432 defining a sleeve interior 1434, a threaded rod 1436 arranged to lie within the sleeve interior 1434, and a retainer 1438 threadingly engaged with the threaded rod 1432. The outer sleeve 1432 is a tubular member that extends between the upper and lower support members 1422, 1424. The threaded rod 1436 also extends between the upper and lower support members 1422, 1424 and remains in a fixed position during movement of the carriage assembly 1430. The retainer 1438 is configured to rotate about the threaded rod 1436 in response to upward or downward movement of the carriage assembly 1430 along the guide member 1428 and moves vertically along the threaded rod 1436 relative to the outer sleeve 1432 with the carriage assembly 1430. The retainer 1438 is configured to selectively engage with the carriage assembly 1430 to lock the carriage assembly 1430 at the selected height.

The carriage assembly 1430 includes a support-top mount 1440 coupled to the guide member 1428 and the support top 14, left and right height-adjustment handles 1442, 1444 coupled to opposite sides of the support-top mount 1440, and a carriage lock 1446 configured to engage selectively with the retainer 1438 to lock the carriage assembly 1430 at the selected height. The support-top mount 1440 supports the support top 14 on the carriage assembly 1430. The left and right height-adjustment handles 1442, 1444 are configured to be grasped and actuated by a user to disengage the carriage lock 1446 from the retainer 1438 and move the carriage assembly 1430 and the support top 14 upwardly or downwardly along the guide member 1428. The carriage lock 1446 is moves between a locked position engaged with the retainer 1438 and an unlocked position spaced from the retainer 1438 in response to actuation of the height-adjustment handles 1442, 1444.

The left and right height-adjustment handles 1442, 1444 are coupled to the carriage lock 1446 and are movable inwardly and outwardly toward and away from one another relative to the support-top mount 1440 to change the carriage lock 1446 from the locked position and the unlocked position. The retainer 1438 includes a polygon-shaped cross section 1450 and the carriage lock 1446 includes a polygon-shaped opening 1452 that matches the polygon-shaped cross section 1450 of the retainer 1438. In the unlocked position, the retainer 1438 is configured to rotate about threaded rod 1436 in response to vertical movement of carriage assembly 1430 relative to the outer sleeve 1432 and the threaded rod 1436. In the locked position, the retainer 1438 extends through a slot 1433 formed in the outer sleeve 1432 and is received in the polygon-shaped opening 1452 of the carriage lock 1446 to block rotation of the retainer 1438 about the threaded rod 1436 so that vertical movement of the carriage assembly 1430 is blocked. The carriage lock 1446 is biased toward the locked position to automatically receive the retainer 1438. Illustratively, the polygon-shaped cross section 1450 and the polygon-shaped opening 1452 are both hexagonal, however, in other embodiments any suitable shape may be used.

The support-top mount 1440 includes a cross beam 1454 coupled to the left and right height-adjustment handles 1442, 1444, a table mount 1456 configured to releasably engage with the support top 14, and a sleeve mount 1458 coupled to the outer sleeve 1432. The cross beam 1454 rigidly supports the table mount 1458 and the sleeve mount 1458. The table mount 1456 includes left and right connector-beam supports 1460, 1462 fixed to the cross beam 1454, a pivot shaft 1464 interconnecting the left and right connector-beam supports, and a pair of attachment hooks 1466, 1468 coupled to the pivot shaft 1464. The pair of attachment hooks 1466, 1468 are configured to engage the connector beam 170 coupled to the support top 14 to retain the support top 14 to the carriage assembly 1430. The sleeve mount 1458 is configured to interact with the outer sleeve 1432 to guide movement of the carriage assembly 1430 vertically along the outer sleeve 1432.

Reference is hereby made to U.S. Pat. No. 9,498,397, filed Mar. 7, 2013, which is expressly incorporated by reference herein in its entirety for the purpose of describing a patient support apparatus that the yoke brackets 20, 1420 and bracket retention systems 1200, 1300 can be incorporated into. The foregoing description of various embodiments and principles of the disclosure have been presented for the purposes of illustration and description. It is not intended to be exhaustive or to limit the disclosure to the precise forms disclosed. Many alternatives, modifications and variations will be apparent to those skilled in the art. Moreover, although multiple inventive aspects and principles have been presented, these need not be utilized in combination, and various combinations of inventive aspects and principles are possible in light of the various embodiments provided above. Accordingly, the above description is intended to embrace all possible alternatives, modifications, aspects, combinations, principles, and variations that have been discussed or suggested herein, as well as all others that fall within the principles, spirit and broad scope of the various possible inventions disclosed herein and defined by the claims.

The invention claimed is:

1. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the right coupling member, and a support-top height adjuster interconnecting the left and right coupling members to the support top and configured to engage selectively with one of the attachment holes formed in the left and right coupling members to establish a selected height of the support top from the ground, wherein the support-top height adjuster includes a carriage assembly movable slidably along the left and right coupling members, a left height-adjustment handle coupled to a left side of the carriage assembly, and a right height-adjustment handle coupled to a right side of the carriage assembly, wherein the left and right height-adjustment handles are movable from a locked position, in which a lock pin of the left and right height-adjustment handles extend into a respective one of the attachment holes formed in the left and right coupling members to retain the support top at the selected height, and an unlocked position, in which the lock pin of the left and right height-adjustment handles are removed from the attachment holes of both the left and right coupling members so that the carriage assembly and at least a portion of the support top is movable together upwardly or downwardly along the left and right coupling members of the yoke bracket to a different selected height, and wherein the first height-adjustment handle includes a first handgrip, a first lock pin fixed to the first handgrip for movement therewith, and a first guide shaft fixed to the carriage assembly and received in a first shaft passageway formed in the first handgrip, and wherein the second height-adjustment handle includes a second handgrip, a second lock pin fixed to the second handgrip for movement therewith, and a second guide shaft fixed to the carriage assembly and received in a second shaft passageway formed in the second handgrip.

2. The surgical table of claim 1, wherein the first and second handgrips are configured to move away from one another to withdraw the first and second lock pins from the attachment holes formed in the left and right coupling members.

3. The surgical table of claim 1, wherein each handgrip is formed to include a guide slot opening into each respective shaft passageway.

4. The surgical table of claim 3, wherein the first guide shaft includes a first guide pin extending radially outward and into the guide slot formed in the first handgrip and the second guide shaft includes a second guide pin extending radially outward and into the guide slot formed in the second handgrip.

5. The surgical table of claim 3, wherein the first height-adjustment handle further includes a plurality of peripheral support rods spaced circumferentially around the first guide shaft and that extend into respective passageways formed in the first handgrip, and the second height-adjustment handle further includes a plurality of peripheral support rods spaced circumferentially around the second guide shaft and that extend into respective passageways formed in the second handgrip.

6. The surgical table of claim 1, wherein the first lock pin extends through a first pin-receiving slot formed in the first guide shaft and the second lock pin extends through a second pin-receiving slot formed in the second guide shaft, and wherein the first and second lock pins are biased toward one another to automatically extend though respective attachment holes to the locked position when the left and right handgrips are released.

7. The surgical table of claim 1, wherein at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position.

8. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the right coupling member, and a support-top height adjuster interconnecting the left and right coupling members to the support top and configured to engage selectively with one of the attachment holes formed in the left and right coupling members to establish a selected height of the support top from the ground, wherein the support-top height adjuster includes a carriage assembly movable slidably along the left and right coupling members, a left height-adjustment handle coupled to a left side of the carriage assembly, and a right height-adjustment handle coupled to a right side of the carriage assembly, wherein the left and right height-adjustment handles are movable from a locked position, in which a lock pin of the left and right height-adjustment handles extend into a respective one of the attachment holes formed in the left and right coupling members to retain the support top at the selected height, and an unlocked position, in which the lock pin of the left and right height-adjustment handles are removed from the attachment holes of both the left and right coupling members so that the carriage assembly and at least a portion of the support top is movable together upwardly or downwardly along the left and right coupling members of the yoke bracket to a different selected height, and wherein at least one of the first column and the second column includes a column base, a connector block coupled to the yoke bracket to support the yoke bracket on the column base, and a bracket retention system including a lock pin movable between a locked position and an unlocked position, a first detent pin fixed to the connector block, and a second detent pin fixed to one of the left and right coupling members with the lock pin.

9. The surgical table of claim 8, wherein in the locked position, the lock pin is received within a throughhole formed in one of the left and right coupling members and a blind hole formed in the connector block and engages the first detent pin to block sliding movement of the lock pin to the unlocked position, and, in the unlocked position, the lock pin is removed from the blind hole formed in the connector block and engages the second detent pin to block sliding movement of the lock pin to the locked position.

10. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the right coupling member, and a support-top height adjuster interconnecting the left and right coupling members to the support top and configured to engage selectively with one of the attachment holes formed in the left and right coupling members to establish a selected height of the support top from the ground, wherein the support-top height adjuster includes a carriage assembly movable slidably along the left and right coupling members, a left height-adjustment handle coupled to a left side of the carriage assembly, and a right height-adjustment handle coupled to a right side of the carriage assembly, wherein the left and right height-adjustment handles are movable from a locked position, in which a lock pin of the left and right height-adjustment handles extend into a respective one of the attachment holes formed in the left and right coupling members to retain the support top at the selected height, and an unlocked position, in which the lock pin of the left and right height-adjustment handles are removed from the attachment holes of both the left and right coupling members so that the carriage assembly and at least a portion of the support top is movable together upwardly or downwardly along the left and right coupling members of the yoke bracket to a different selected height, wherein at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position, wherein in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position, wherein the lock pin is formed to include a first channel and a second channel spaced apart from the first channel, and wherein the pin latch extends into the first channel in the latched position when the lock pin is in the locked position and the pin latch extends into the second channel in the latched position when the lock pin is in the unlocked position.

11. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the left coupling member, wherein at least one of the first column and the second column includes a column base, a connector block coupled to the yoke bracket to support the yoke bracket on the column base, and a bracket retention system including a lock pin movable between a locked position and an unlocked position, a first detent pin fixed to the connector block, and a second detent pin fixed to one of the left and right coupling members with the lock pin, and wherein in the locked position, the lock pin is received within a throughhole formed in one of the left and right coupling members and a blind hole formed in the connector block and engages the first detent pin to block sliding movement of the lock pin to the unlocked position, and, in the unlocked position, the lock pin is removed from the blind hole formed in the connector block and engages the second detent pin to block sliding movement of the lock pin to the locked position.

12. The surgical table of claim 11, wherein the lock pin is formed to include a first detent channel and a second detent channel, and wherein: (i) the first detent pin is configured to extend into the first detent channel and the second detent pin is configured to extend into the second detent channel in the locked position, and (ii) the second detent pin is configured to extend in to the first detent channel in the unlocked position.

13. The surgical table of claim 12, wherein the first detent pin extends along a first axis and engages the lock pin at a first circumferential orientation relative to the lock pin and the second detent pin extends along a second axis and engages the lock pin at a second circumferential orientation relative to the lock pin different than the first circumferential orientation.

14. The surgical table of claim 12, wherein the lock pin includes a pin shaft formed with the first and second detent channels, a retainer ring arranged to lie between the first and second detent channels, and a pin head arranged outside of the throughhole and the blind hole and configured to be gripped by a user to move the lock pin between the locked position and the unlocked position.

15. The surgical table of claim 12, wherein the lock pin is a first lock pin that extends through the left coupling member and into a left side of the connector block and wherein the bracket retention system further includes a second lock pin that extends through the right coupling member and into a right side of the connector block.

16. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the left coupling member, wherein at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position, wherein in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position, wherein the lock pin is formed to include a first channel and a second channel spaced apart from the first channel, and wherein the pin latch extends into the first channel in the latched position when the lock pin is in the locked position and the pin latch extends into the second channel in the latched position when the lock pin is in the unlocked position.

17. The surgical table of claim 16, wherein the latch bar is biased toward the latched position to automatically extend into one of the first and second channels when the lock pin is in the locked position or the unlocked position.

18. A surgical table comprising:

a foundation frame including a first column and a second column spaced apart from the first column, a support top configured to support a patient thereon and supported above ground by the first column and the second column, and a yoke bracket arranged to interconnect at least one of the first and second columns and the support top, the yoke bracket including:

a left coupling member formed to include a number of attachment holes situated between a front surface and a back surface of the left coupling member, a right coupling member formed to include a number of attachment holes situated between a front surface and a back surface of the left coupling member, wherein at least one of the first column and the second column includes a column base, a connector block coupled to the yoke bracket to support the yoke bracket on the column base, and a bracket retention system including a lock pin movable between a locked position and an unlocked position and a pin latch movable relative to the lock pin between a latched position and an unlatched position, wherein in the locked position, the lock pin is received within a throughhole formed in one of the left and right coupling members and a blind hole formed in the connector block and the pin latch engages the lock pin to block sliding movement of the lock pin to the unlocked position, and, in the unlocked position, the lock pin is removed from the blind hole formed in the connector block and the pin latch engages the lock pin to block sliding movement of the lock pin to the locked position, and wherein the pin latch includes a latch bar configured to extend into a channel formed in the lock pin to block sliding movement of the lock pin from the locked position to the unlocked position and a latch handle configured to be moved by a user to change the pin latch between the latched position, in which the latch bar extends into the channel of the lock pin, and the unlatched position, in which the latch bar is removed from the channel and the lock pin is free to slide relative to the connector block from the locked position to the unlocked position.

* * * * *